United States Patent [19]
Saville

[11] Patent Number: 5,255,700
[45] Date of Patent: Oct. 26, 1993

[54] CAPACITY FUSE VALVE

[75] Inventor: Eric J. Saville, Alta Loma, Calif.

[73] Assignee: Pneu-Draulics, Inc., Rancho Cucamonga, Calif.

[21] Appl. No.: 714,931

[22] Filed: Jun. 13, 1991

Related U.S. Application Data

[63] Continuation-in-part of Ser. No. 470,867, Jan. 26, 1990, abandoned, which is a continuation-in-part of Ser. No. 229,848, Aug. 8, 1988, abandoned.

[51] Int. Cl.⁵ ............................................. F16K 21/16
[52] U.S. Cl. .................................... 137/101; 137/468; 137/493.7; 137/508
[58] Field of Search ............... 137/101, 118, 468, 117, 137/508; 251/16, 122, 205

[56]     References Cited
     U.S. PATENT DOCUMENTS

| 1,436,018 | 11/1922 | Dieter | 137/118 X |
|---|---|---|---|
| 2,592,486 | 4/1952 | Stark | 251/16 |
| 2,592,487 | 4/1952 | Stark | 251/16 |
| 2,956,577 | 10/1960 | Kirkham | 137/118 |
| 3,384,338 | 5/1968 | Dermody | 251/205 |
| 3,410,521 | 11/1968 | Sowers et al. | 251/205 |
| 3,431,944 | 3/1969 | Sakuma | 137/508 X |
| 3,519,011 | 7/1970 | Dennanen | 137/508 X |
| 3,848,622 | 11/1974 | Cummings | 137/468 |
| 4,230,300 | 10/1980 | Wiltse | 251/205 |
| 4,303,197 | 12/1981 | Sandau | 137/468 |
| 4,413,646 | 11/1983 | Platt et al. | 251/122 X |
| 4,503,878 | 3/1985 | Taylor | 251/122 |
| 4,655,245 | 4/1987 | Gellerson | 251/16 X |
| 4,691,730 | 9/1987 | Portolese et al. | 137/101 |
| 4,753,264 | 6/1988 | Uchino et al. | 137/117 |

FOREIGN PATENT DOCUMENTS

| 691108 | 5/1940 | Fed. Rep. of Germany | 251/16 |
|---|---|---|---|
| 495489 | 3/1976 | U.S.S.R. | 137/101 |
| 796156 | 6/1958 | United Kingdom | 137/468 |

Primary Examiner—Stephen M. Hepperle
Attorney, Agent, or Firm—Boniard I. Brown

[57] ABSTRACT

An improved valve of the class referred to as capacity fuse valves which closes in response to passage of a total fluid flow volume through the valve to the valve outlet. The incoming fluid entering the valve inlet is split into a main flow that passes through a variable main flow metering port to the valve outlet and a control flow that passes through a variable control flow metering orifice and is utilized to close the valve upon passage of a predetermined main flow volume (main flow valve closure volume) through the valve. The areas of the main flow metering port and the control flow metering orifice are varied in response to the fluid inflow rate into the valve inlet and/or fluid temperature in such a way as to maintain a substantially fixed ratio between the main flow rate and the control flow rate, and thereby a substantially constant main flow valve closure volume, over a range of fluid inflow rates and/or temperatures. The area ratio of the main flow metering port and control flow metering orifice is manually adjustable to vary the main flow closure volume of the valve. A related flow proportion method and device.

33 Claims, 10 Drawing Sheets

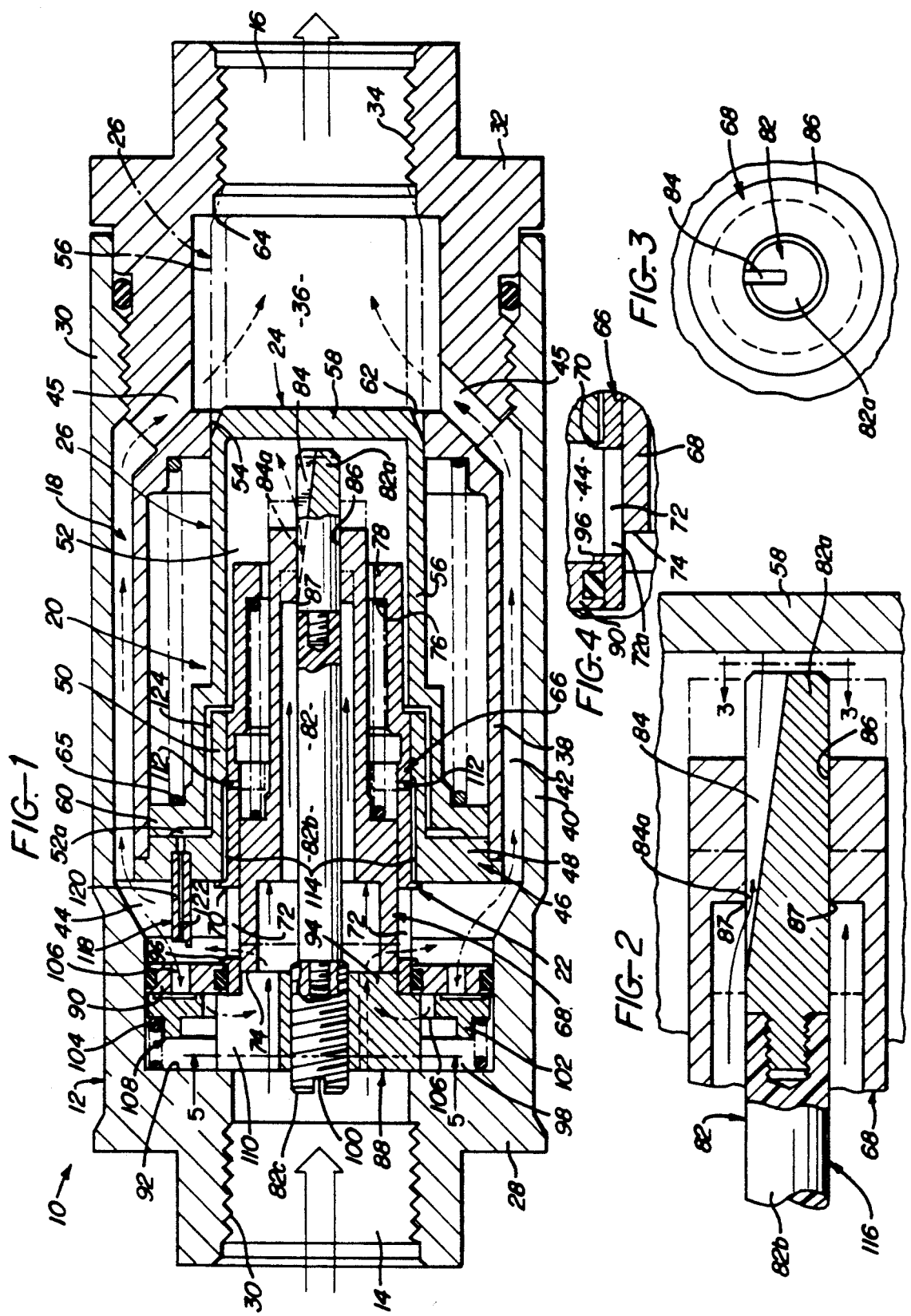

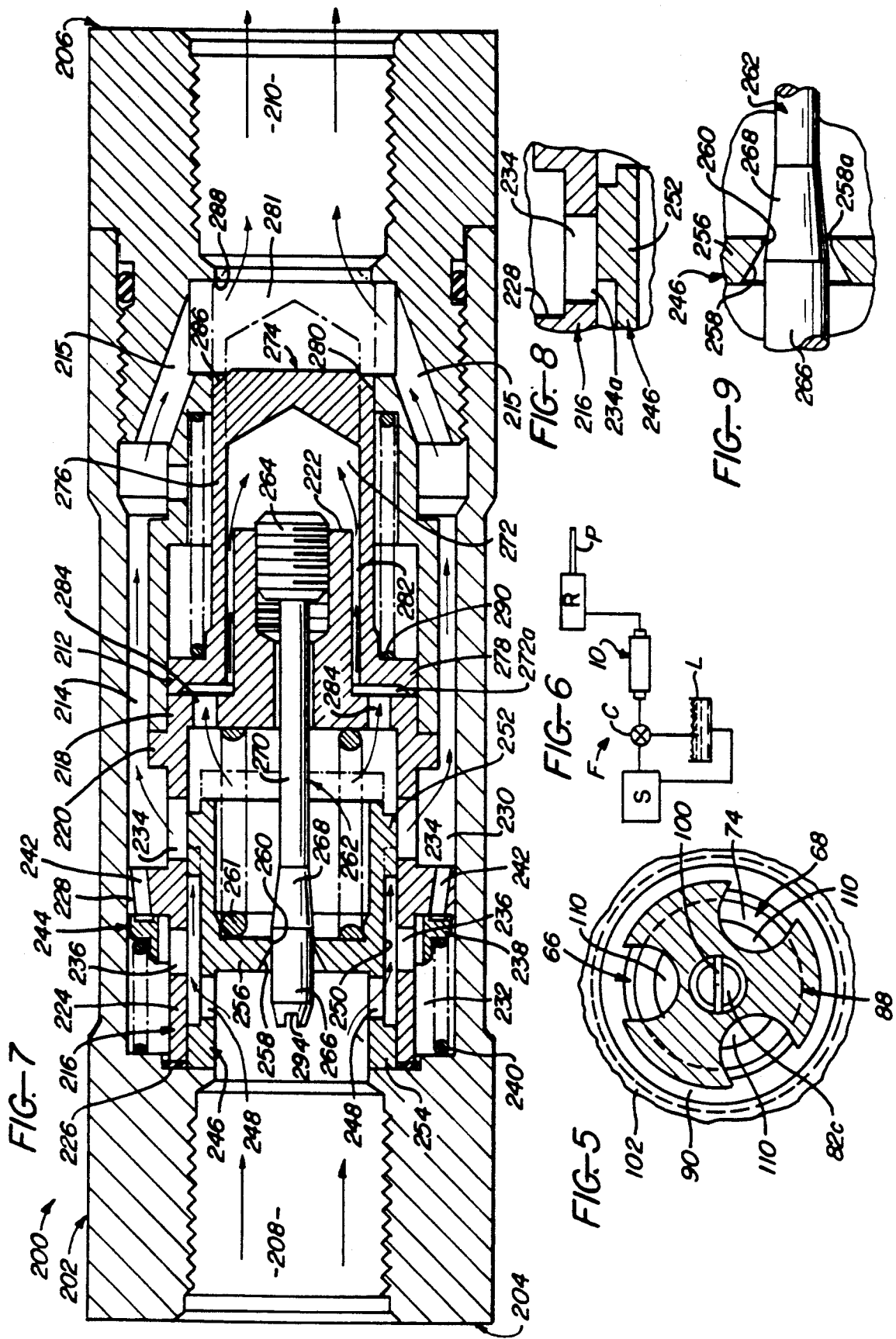

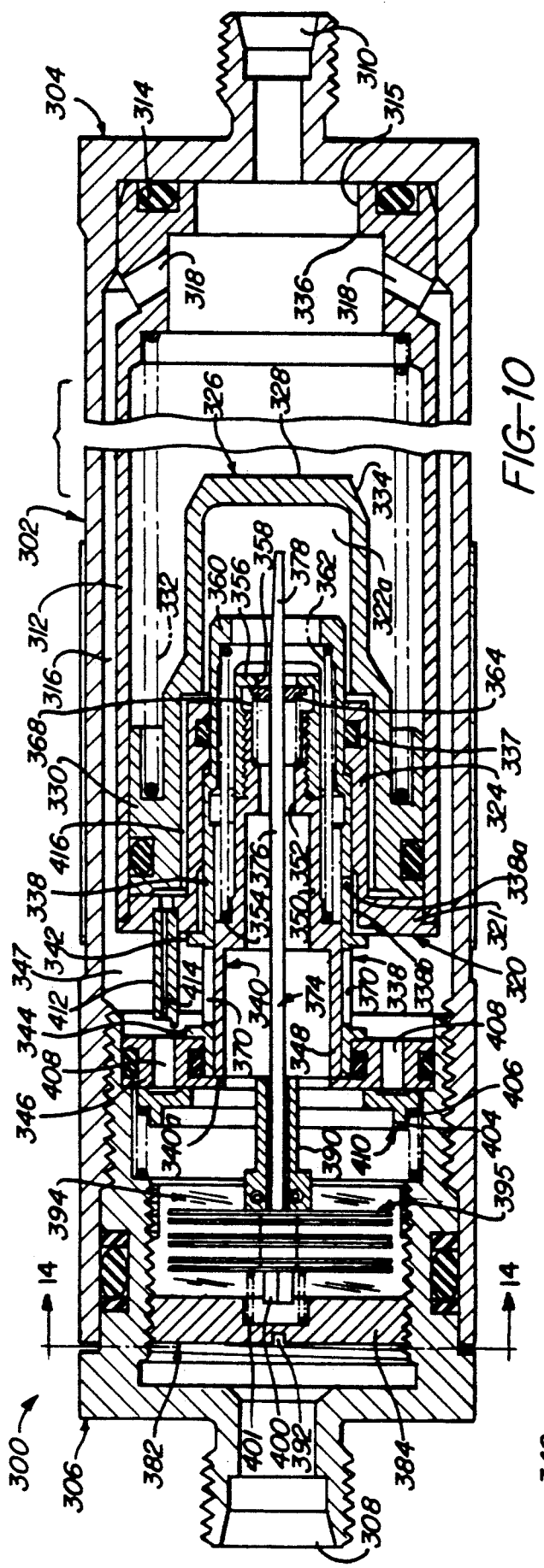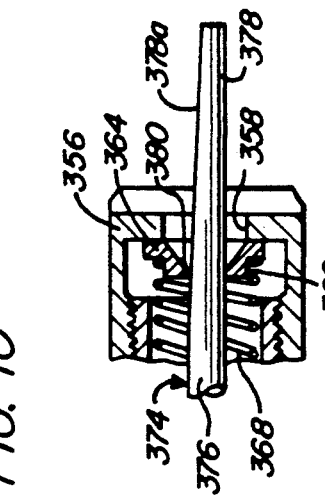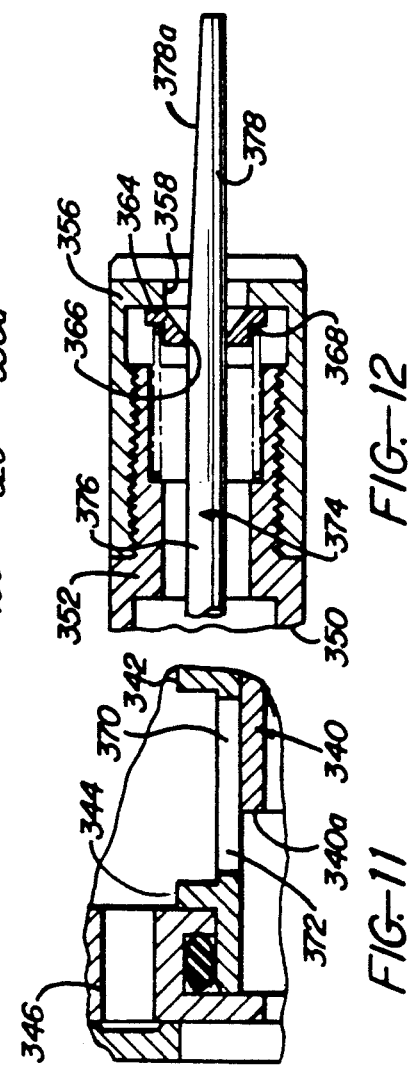

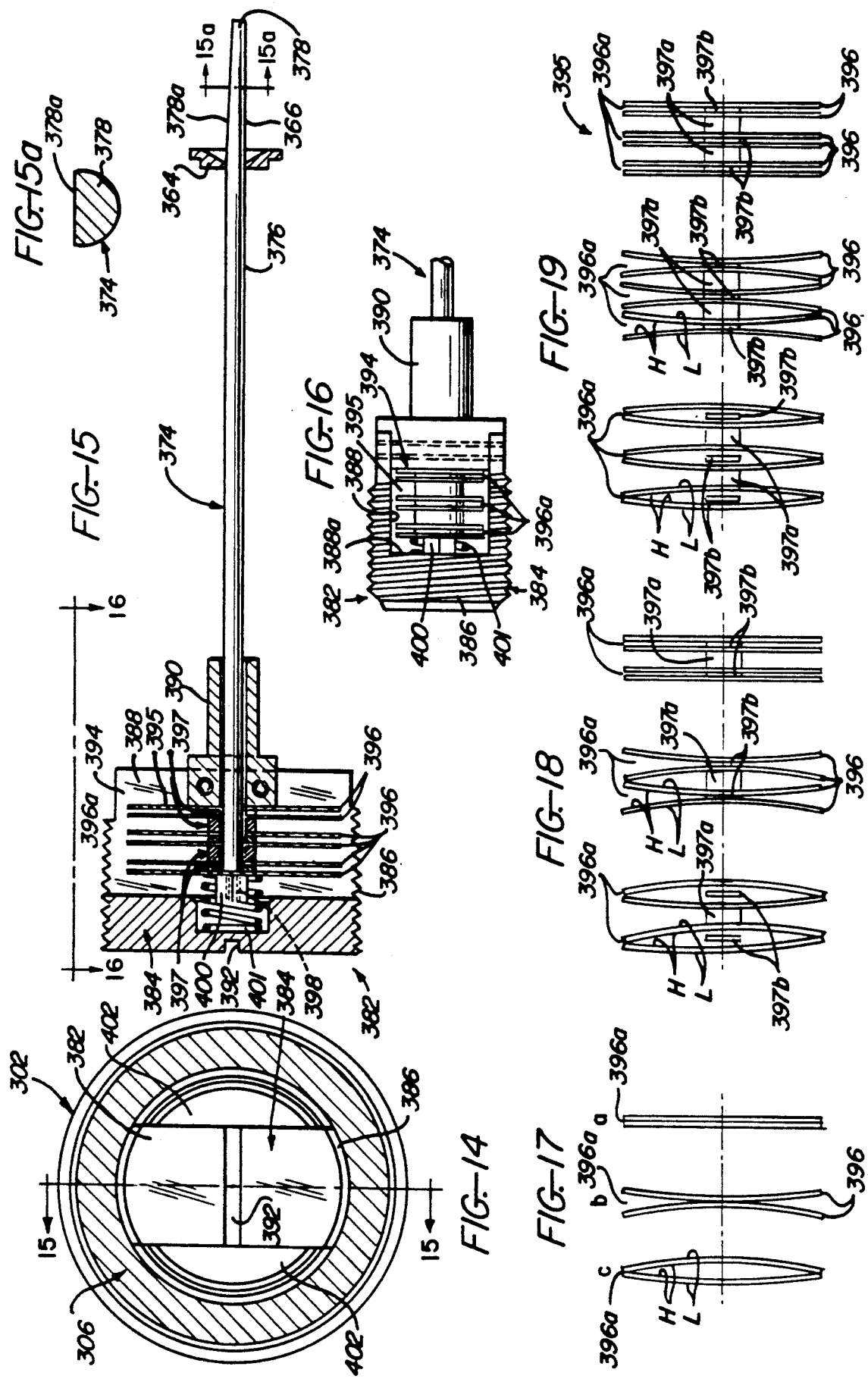

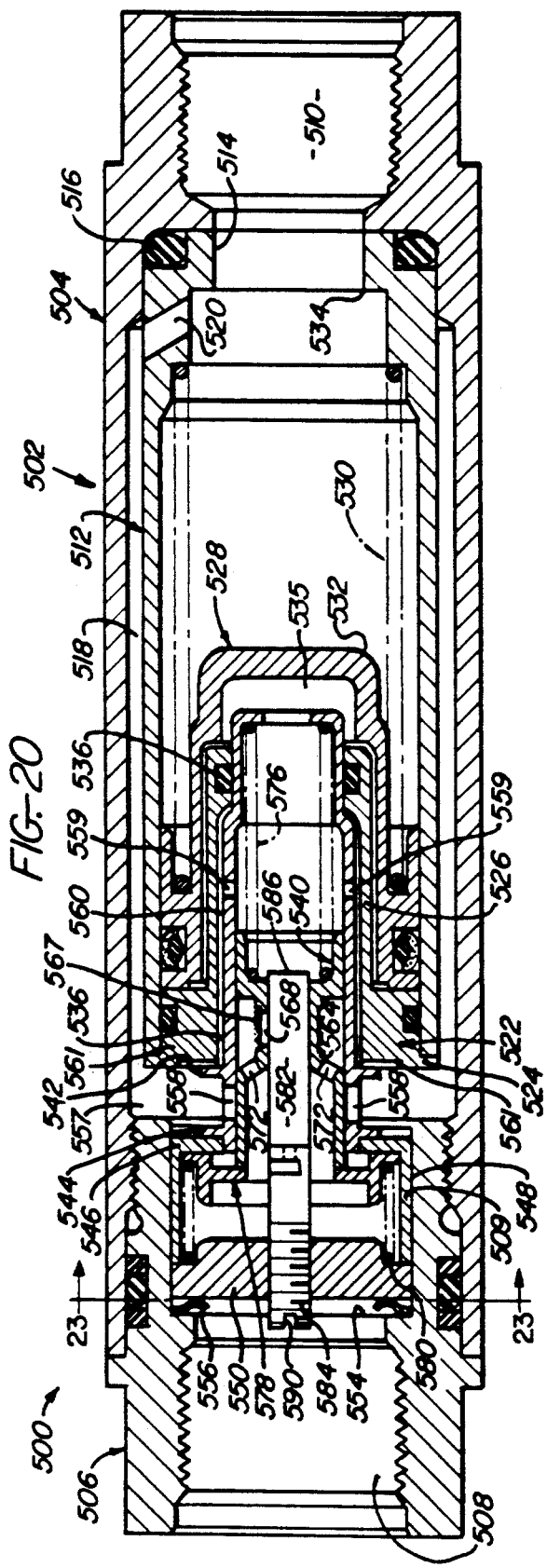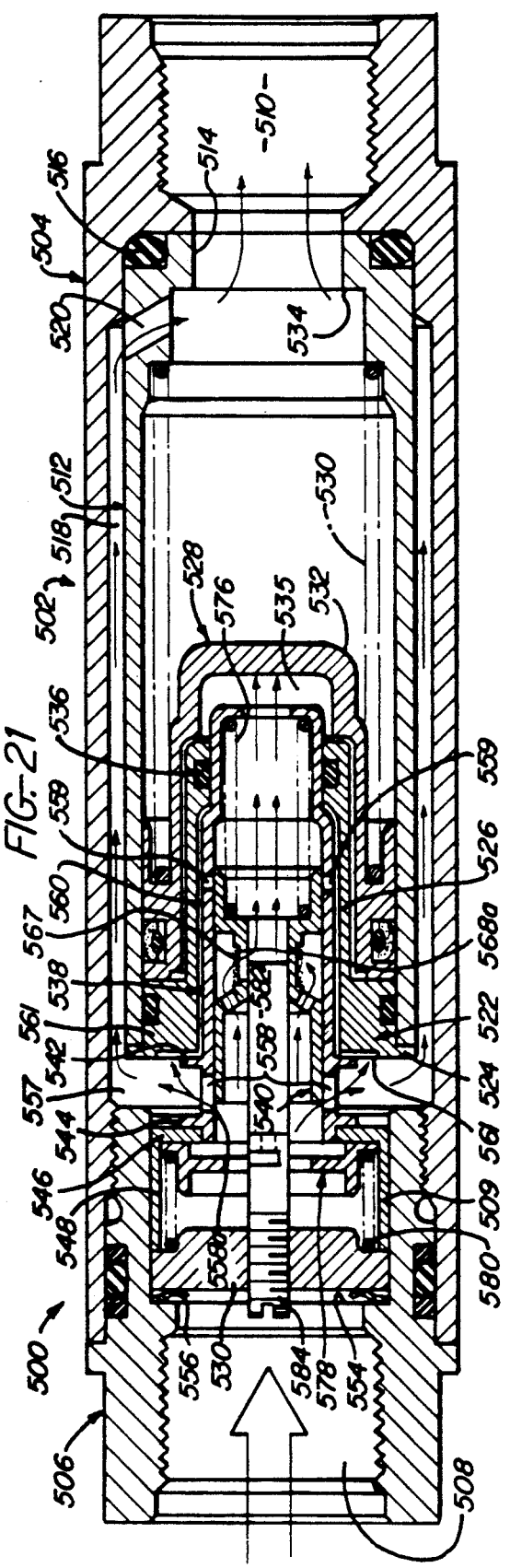

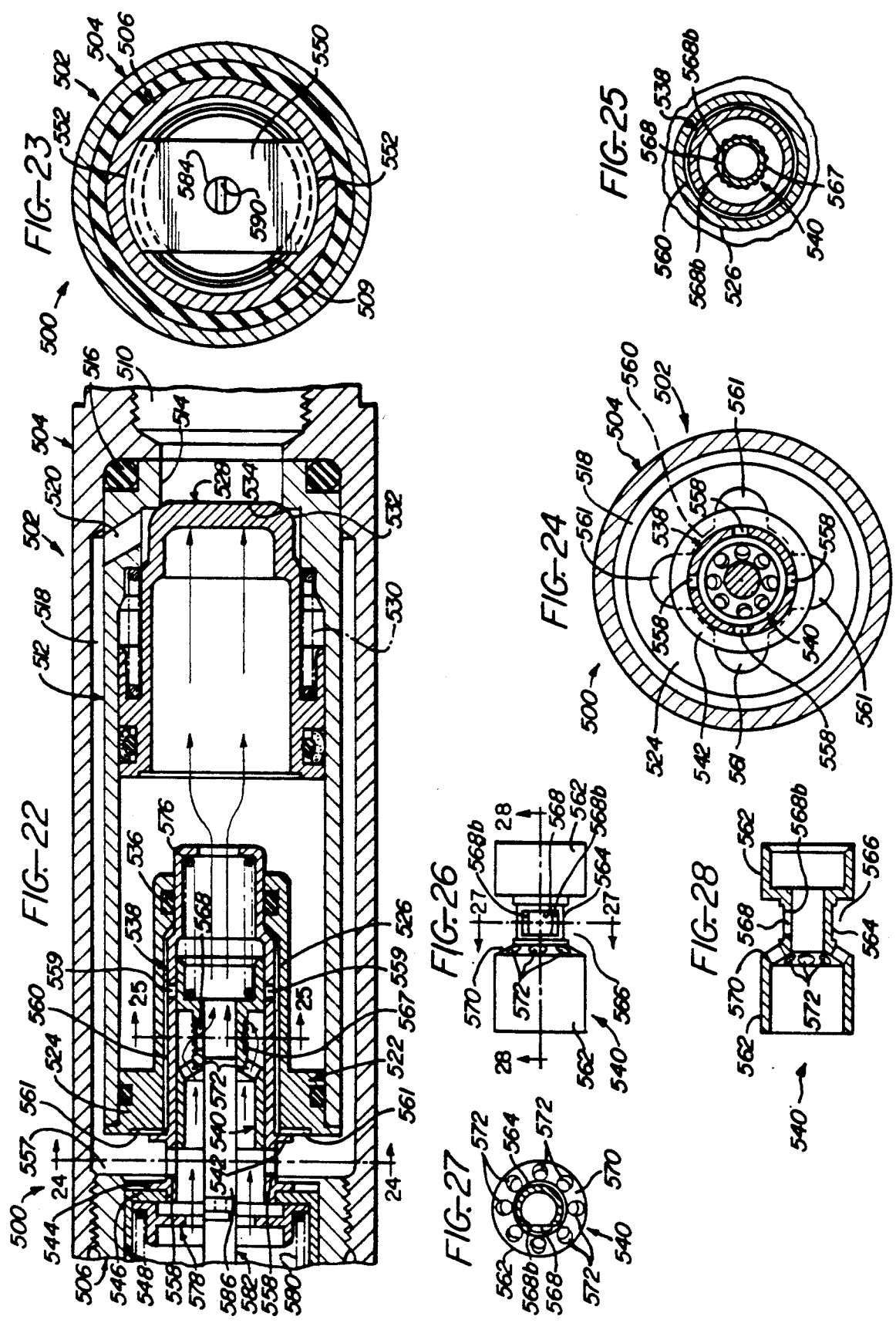

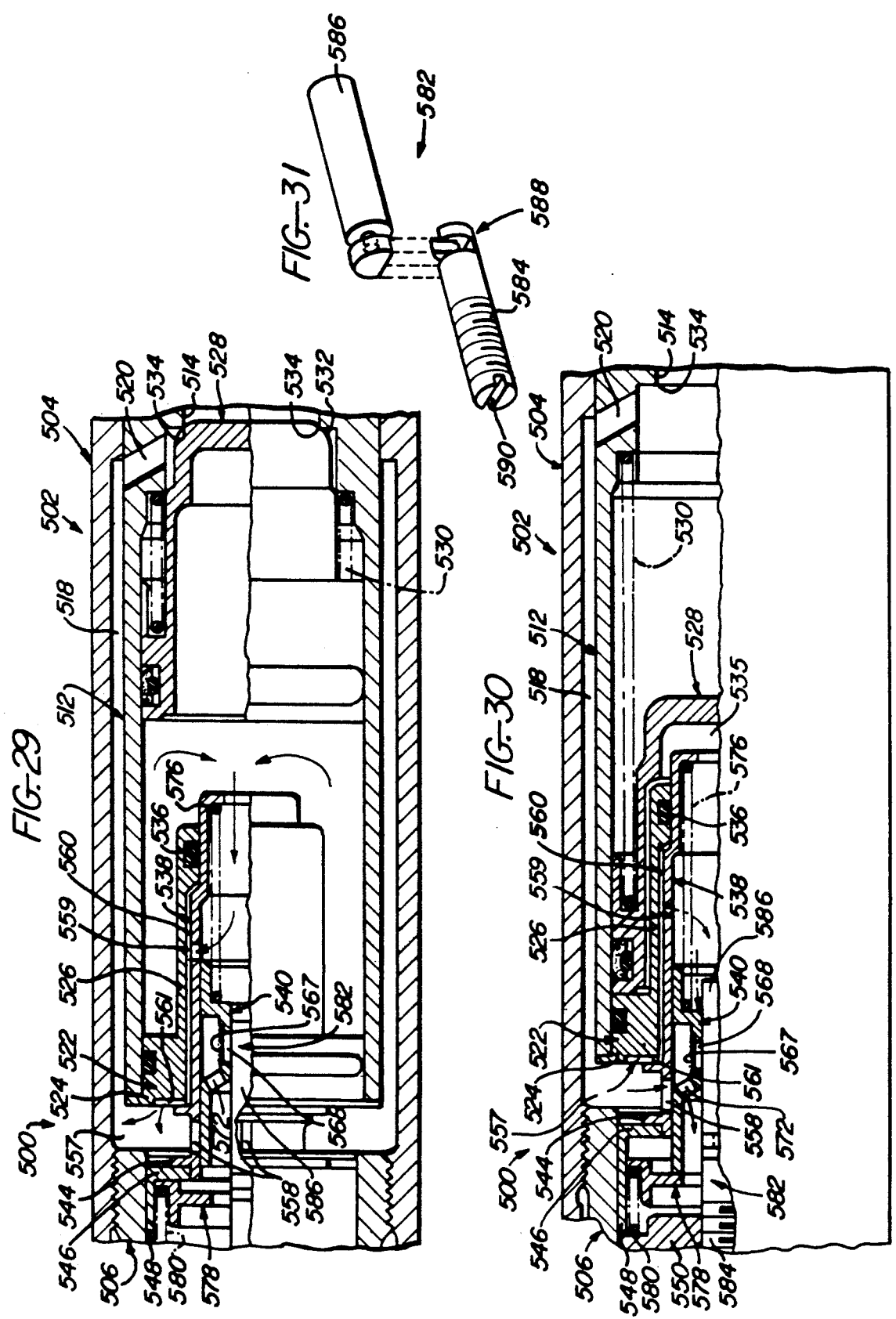

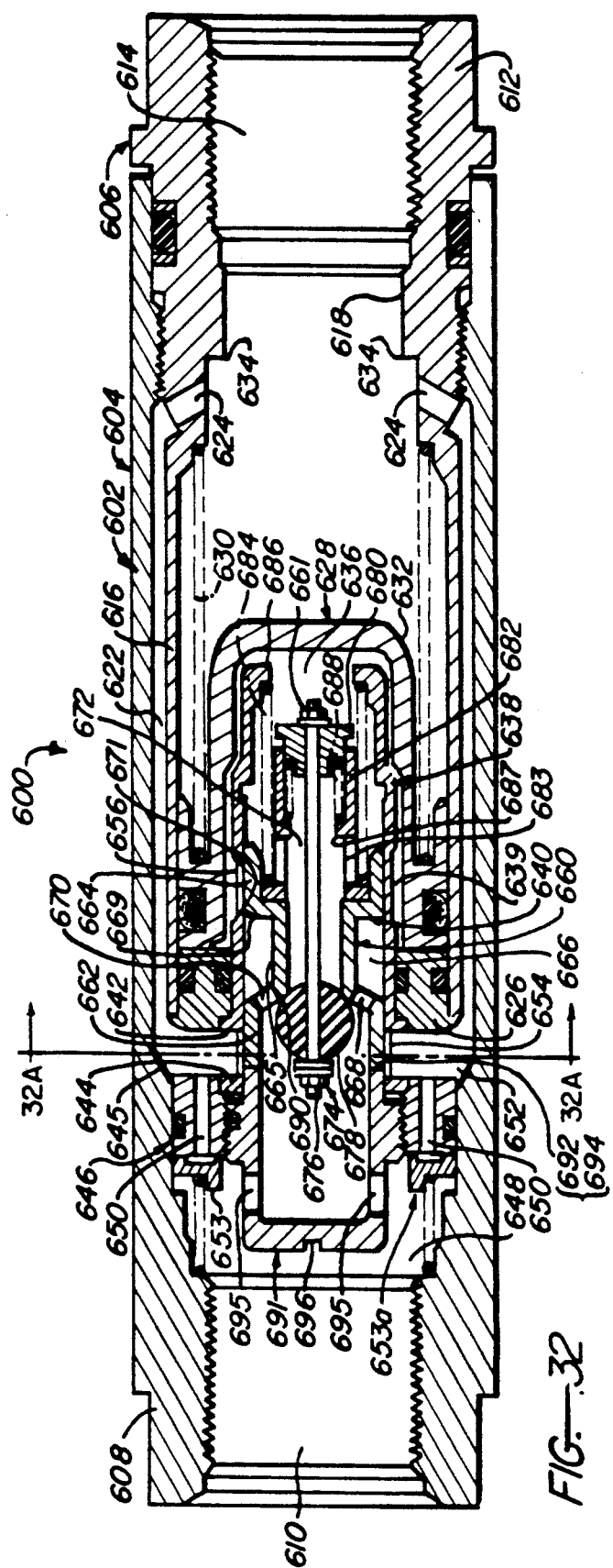
FIG.—32
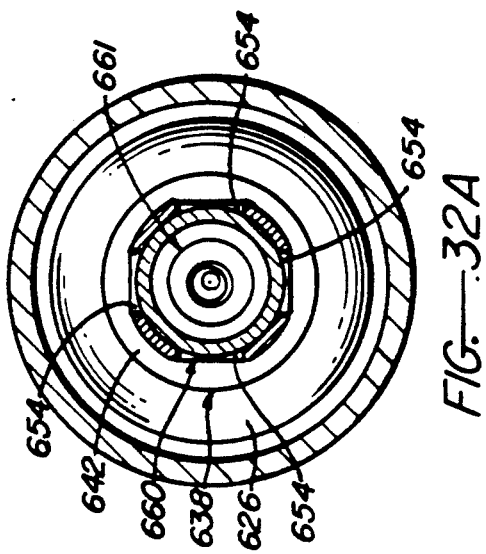
FIG.—32A

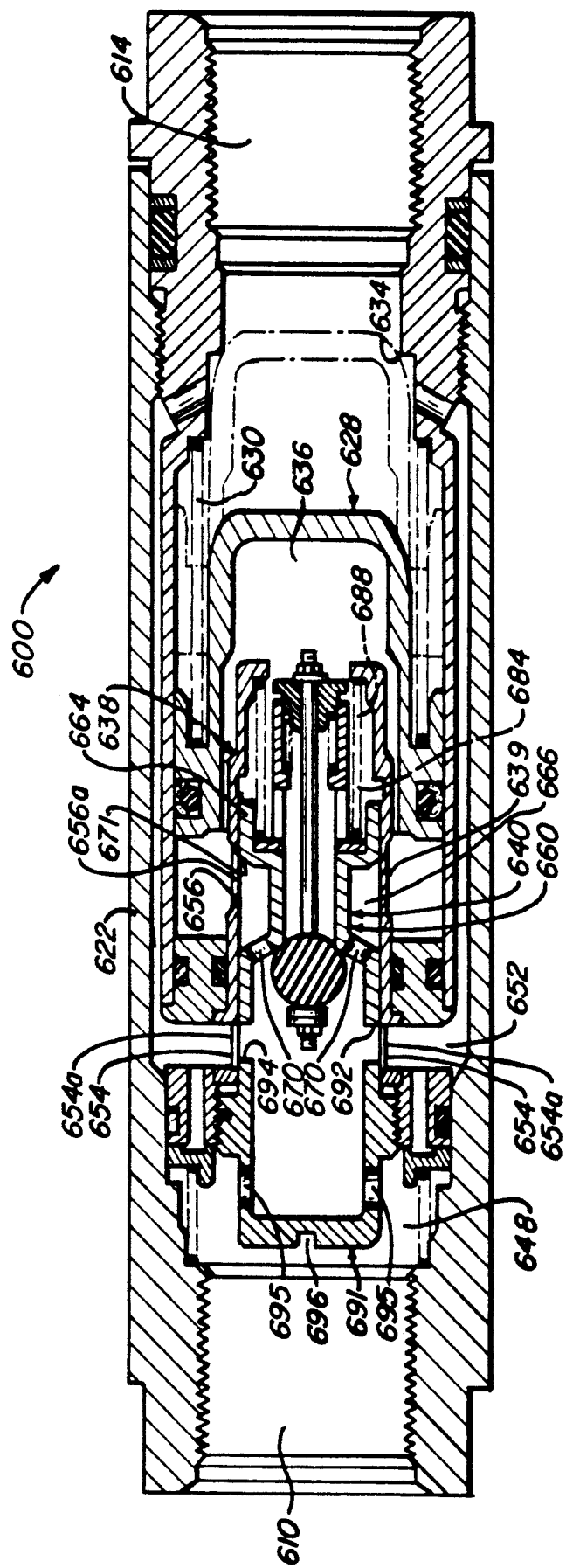
FIG.—33

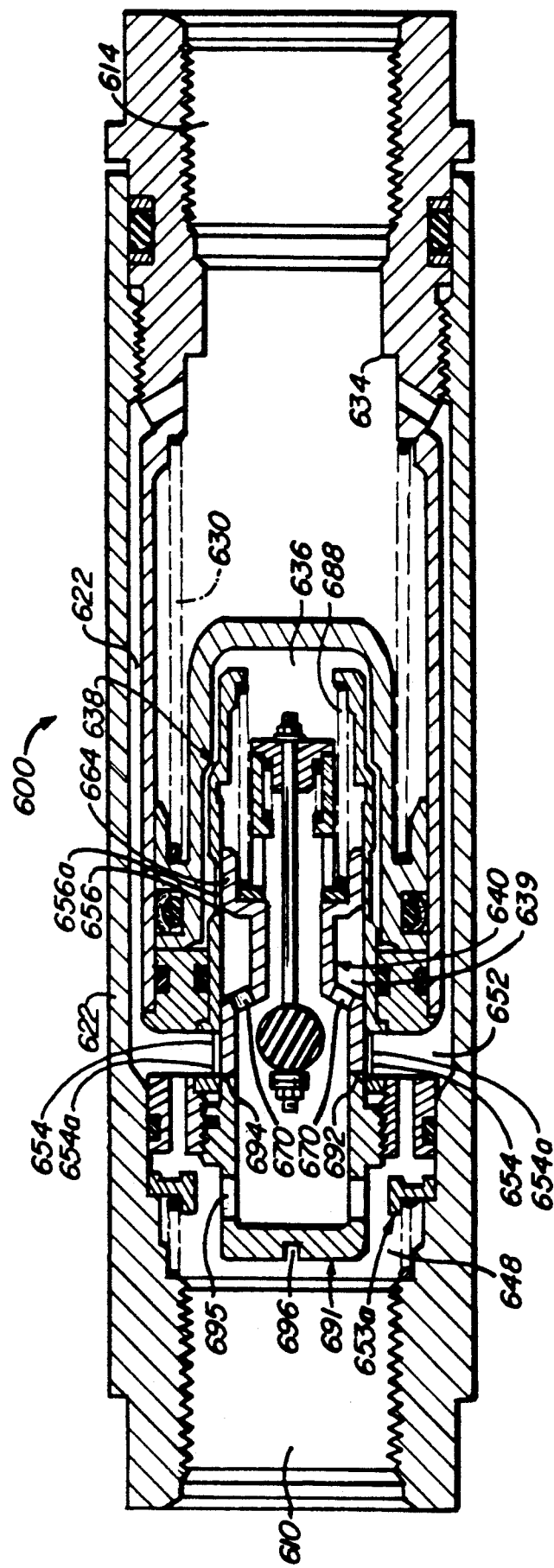
FIG.—34

CAPACITY FUSE VALVE

RELATED APPLICATIONS

This application is a continuation-in-part of application Ser. No. 07/470,867, filed Jan. 26, 1990, now abandoned, which is a continuation-in-part of application Ser. No. 07/229,848, filed Aug. 8, 1988, now abandoned.

BACKGROUND OF THE INVENTION

1. Field of the Invention

This invention relates generally to fluid flow control valves and more particularly to an improved so-called capacity fuse valve which closes in response to a predetermined fluid flow volume through the valve. The invention relates also to novel flow control means and a novel temperature responsive actuator for the valve and other uses.

2. Description of the Prior Art

The valve of this invention belongs to the class of valves referred to as fuse valves because of their general similarity of purpose and operation to electrical fuses. Thus, a fuse valve is designed to be installed in a pressure fluid system between a pressure fluid source and a fluid receiver, such as a pressure fluid actuator, and to remain open as long as fluid flow through the valve is within a predetermined normal range. The valve closes to block fluid flow through the system in response to a predetermined flow quantity through the valve. The flow quantity to which some fuse valves respond is flow velocity. This type of fuse valve, which may be thought of as a velocity fuse valve, is designed to remain open as long as the flow velocity through the valve does not exceed a predetermined maximum velocity and to close if this maximum flow velocity is exceeded. Other fuse valves, referred to as capacity fuse valves, respond to total flow volume through the valves. Such a capacity fuse valve is intended for use in a fluid pressure system wherein fluid flow occurs intermittently and is designed to close in response to a predetermined total flow volume through the valve.

U.S. Pat. Nos. 2,821,209 and 4,465,093 disclose examples of known velocity fuse valves. U.S. Pat. No. 3,880,398 discloses a capacity fuse valve. Another capacity fuse valve is a so-called floating piston valve, one example of which is disclosed in U.S. Pat. No. 4,655,245.

Fuse valves, both velocity fuse valves and capacity fuse valves, are used for a variety of purposes. One particularly important use of such valves is in hydraulic systems, such as aircraft hydraulic systems, to prevent fluid loss, especially catastrophic fluid loss, in the event of a leak or fluid line rupture. In this application, the velocity fuse valve responds to the sudden increase in flow velocity through the valve resulting from a rupture in the fluid line containing the valve by closing the valve before substantial fluid loss can occur. In other words, the velocity fuse valve is designed to sense and then respond to an abnormally high flow condition. The purpose of a capacity fuse valve, on the other hand, is to pass or convey to a fluid actuator or other fluid receiver a volume of fluid which may vary within a normal volume range determined by the normal fluid requirements of the fluid receiver. The valve closes to prevent further flow through the valve if the total flow volume through the valve exceeds the predetermined upper limit of this normal volume range. Thus, a capacity fuse valve prevents rather than responds to an abnormal flow condition.

SUMMARY OF THE INVENTION

This invention provides an improved capacity fuse valve as well as novel flow control means for the valve and other uses. The improved capacity fuse valve of the invention includes a valve body having a fluid inlet and a fluid outlet, and novel fluid flow control means within the body which are responsive to the flow volume through the valve from its inlet to its outlet and close the valve in response to a predetermined flow volume. This flow control means splits the incoming fluid entering the valve inlet into a main flow which passes through a fluid passage in the valve body to the valve outlet and a control flow whose flow rate is maintained in a fixed but adjustable ratio to the main flow rate. The control flow volume is measured and utilized to close the valve, that is cut off main flow through the valve, in response to a predetermined maximum control flow volume (control flow valve closure volume) corresponding to a predetermined maximum main flow volume (main flow valve closure volume). Thus the valve will pass only this maximum main flow volume or a lesser volume from the valve inlet to the valve outlet.

The fluid flow control means comprises novel flow proportioning means including variable main flow port means through which the main flow passes to the valve outlet and variable control flow orifice means through which the control flow passes. The flow control means also comprises a main flow shutoff valve which is movable by this control flow from an open position to a closed position to block main flow from the valve inlet to the valve outlet. In the preferred fuse valve, the flow proportioning means directs the control flow into a chamber at one side of the shutoff valve to move the valve to its closed position and thereby close the capacity fuse valve in response to entrance into the chamber of a predetermined control flow volume (control flow valve closure volume). The shutoff valve reopens in response to venting of the valve inlet to a low pressure fluid receiver.

According to one feature of the invention, the areas of the main flow metering port means and the control flow metering orifice means are varied proportionally in response to the fluid inflow rate through the valve inlet in such a way as to maintain a fixed ratio between the main flow rate and control flow rate, and thereby a constant main valve closure volume, over a range of fluid inflow rates to the valve. The area ratio of the main flow port means and control flow orifice means is manually adjustable to vary the ratio of the main flow and control flow rates and thereby the main flow valve closure volume.

Another feature of the invention is concerned with correcting or compensating for temperature-induced, fluid viscosity changes which tend to change the main flow valve closure volume. According to this feature, the flow control means of the valve is temperature compensated to adjust the area ratio of the main flow metering port means and control flow orifice means in response to fluid temperature in such a way as to maintain the main flow valve closure volume relatively constant over a range of fluid temperatures. This temperature compensation is accomplished in part by a novel temperature responsive actuator which constitutes an

BRIEF DESCRIPTION OF THE DRAWINGS

FIG. 1 is a section though an improved capacity fuse valve according to the invention;

FIG. 2 is an enlarged detail of FIG. 1;

FIG. 3 is a section on line 3—3 in FIG. 1;

FIG. 4 is an enlarged detail of FIG. 1;

FIG. 5 is a section on line 5—5 in FIG. 1;

FIG. 6 illustrates a hydraulic system including a present fuse valve;

FIG. 7 is a section through a modified capacity fuse valve of the invention;

FIGS. 8 and 9 are enlarged details of FIG. 7;

FIG. 10 is a section through a modified capacity fuse valve of the invention;

FIGS. 11-13 are enlarged details of FIG. 10;

FIG. 14 is a section on line 14—14 in FIG. 10;

FIG. 15 is a section on line 15—15 in FIG. 14;

FIG. 15a is a section on line 15a-15a in FIG. 15;

FIG. 16 is a view looking in the direction of the arrows 16—16 in FIG. 15;

FIGS. 17, 18, 19 illustrate the temperature response of the valve of FIG. 10;

FIG. 20 is a longitudinal section through a further modified capacity fuse valve of the invention;

FIG. 21 is a section similar to FIG. 20 during fluid flow through the valve;

FIG. 22 is a section similar to FIGS. 20 and 21 showing the valve immediately following its closure to cut off fluid flow through the valve;

FIG. 23 is a section on line 23—23 in FIG. 20 ;

FIG. 24 is a section on line 24—24 in FIG. 22 ;

FIG. 25 is a section on line 25—25 in FIG. 22;

FIG. 26 is a side elevation of a flow metering valve sleeve in the fuse valve of FIG. 20;

FIG. 27 is a section on line 27—27 of FIG. 26;

FIG. 28 is a section on line 28—28 of FIG. 26;

FIG. 29 is a section similar to FIG. 22 showing the valve shortly after the valve closure condition of FIG. 22;

FIG. 30 is a section through the valve of FIG. 20 during reverse flow through the valve;

FIG. 31 illustrates a coupling in the valve of FIGS. 20-30;

FIG. 32 is a section through a modified and presently preferred capacity fuse valve of the invention;

FIG. 32A is an enlarged section taken on line 32A—32a in FIG. 32;

FIG. 33 is section similar to FIG. 32 showing the valve in full lines during fluid flow through the valve and in broken lines in its closed state wherein it blocks fluid flow; and FIG. 34 is a section similar to FIGS. 32 and 33 during reverse flow through the valve.

DESCRIPTION OF PREFERRED EMBODIMENTS

Turning first to FIGS. 1-6 of the drawings, there is illustrated a capacity fuse valve 10 according to the invention and a simple fluid pressure system F in which the fuse valve may be used. This fluid pressure system is a hydraulic system including a hydraulic linear actuator R having a piston P which is extendable by fluid pressure and retractable by other means (not shown), a low pressure hydraulic fluid receiver L such as a fluid reservoir, a source S of fluid under pressure which is assumed to be a pump having its intake connected to the receiver L, and control means C for selectively connecting the actuator R to the fluid source S and to the low pressure fluid receiver L. The fuse valve 10 is connected between the control means C and the actuator R.

When the control means C is set to connect the actuator R to the fluid pressure source S, forward fluid flow occurs from the source to the actuator through the fuse valve 10 to extend the actuator piston P. When the control means C is set to connect the actuator R to the fluid receiver L, the piston P is retracted by its retraction means, and reverse fluid flow occurs from the actuator, through the fuse valve 10, to the fluid receiver. The fuse valve 10 is constructed and arranged to close in response to a predetermined forward flow volume through the valve just slightly greater than the maximum fluid volume required to operate the actuator through its full travel and thereby prevent substantial or catastrophic fluid loss in the event of a leak or rupture. Thus, the capacity fuse valve 10 will remain open to pass hydraulic fluid to the actuator R, during each actuation of the flow control device C to operate the actuator, so long as the flow volume through the valve remains within a normal range. The valve will close to prevent a flow volume through the valve in excess of this normal volume range. The valve reopens when the fluid supply to the valve is cut off and the valve inlet is vented to a fluid reservoir or the like.

Proceeding now with a description of the capacity fuse valve 10, the latter has a body 12 containing a fluid inlet 14, a fluid outlet 16, and a fluid passage 18 communicating the inlet and outlet. Within the valve body 12 are novel fluid flow control means 20 according to the invention responsive to the flow volume through the valve from its inlet 14 to its outlet 16 for closing the valve in response to a predetermined total flow volume through the valve. The flow control means effectively measures the total volume of flow through the valve and closes the valve in response to a predetermined measured flow volume. In the valve application discussed above, this measured flow volume at which the valve closes is made greater by a small amount than the maximum fluid volume required to operate the hydraulic actuator R, that is the fluid volume required to operate the actuator through its full travel.

As in the capacity fuse valve of U.S. Pat. No. 4,655,245, flow through the valve 10 from its inlet 14 to its outlet 16 is measured indirectly by splitting the incoming fluid entering through the inlet into a main flow which passes through the valve passage 18 to the valve outlet 16 and a control flow, maintaining the control flow rate in a substantially fixed ratio to the main flow rate regardless of the flow rate and temperature of the entering fluid, and measuring the control flow volume. This control flow volume, which has known ratio to the main flow volume, is utilized to effect closure of the valve upon passage of a predetermined main flow volume through the valve.

To this end, the novel flow control means 20 of the valve 10 comprises flow proportioning means 22 for splitting the incoming fluid entering the valve inlet 14 into a main flow which passes through the valve passage 18 to the valve outlet 16 and a control flow whose flow rate is maintained in a substantially fixed, predetermined ratio to the main flow rate, and shutoff valve means 24 responsive to the control flow volume for cutting off the main flow through the valve in response to a predetermined control flow volume, referred to herein as the control flow valve closure volume, corresponding to the predetermined main flow volume at which the capacity fuse valve is intended to close, referred to herein as the main flow valve closure volume. This main flow valve closure volume equals the maximum fluid volume the valve will deliver to the fluid receiver or actuator R. The shutoff valve means 24 indirectly measures the main flow volume by measuring the control flow volume and includes a shutoff valve member 26 movable from a normal open position to a closed position in response to the measured control flow attaining its valve closure volume. The shutoff valve member, when fully open, does not restrict the primary flow. The valve member when closed totally blocks main fluid flow through the valve.

Referring now in more detail to the drawings, the valve body 12 comprises an elongate, generally tubular body including a left hand (as viewed in FIG. 1) outer tubular section 28 having a coaxial threaded opening 30 at its left end forming the valve inlet 14. Threaded in the right end of the tubular body section 30 is an inner tubular section 32 having a threaded opening 34 at its right end opening inwardly to an outlet chamber 36 in the section and forming the valve outlet 16. The inner body section 32 has a left hand tubular end portion 38 which extends coaxially through the outer body section 28 in radially spaced relation to the surrounding wall 40 of the outer section. The tubular end portion 38 and wall 40 form therebetween an annular flow space 42 which opens at one end to a chamber 44 within the outer body section 28 between the fluid inlet 14 and the adjacent end of the inner body section 32. The opposite end of the flow space 42 opens to the outlet chamber 36 in the inner body section 32 through ports 45 in the inner section. The chamber 44, flow space 42, ports 45, and outlet chamber 36 together form the fluid passage 18 through the valve.

At the left hand end of the inner body section 32 is an end member 46 having an annular shoulder 48 fixed within the open left hand end of the inner body section and a sleeve 50 extending coaxially through the inner body section. The interior of the inner body section 32 opens to the outlet chamber 36 through an intervening coaxial bore 54.

Shutoff valve member 26 is a cup-like piston having a generally cylindrical body 56 closed at its right end by an end wall 58 and surrounded at its open left hand end by a shoulder 60. The shutoff valve member 26 is slidable within the tubular portion 38 of the inner body section 32 in coaxial surrounding relation to the sleeve 50 of the end member 46. The shutoff valve member has its shoulder 60 disposed in fluid sealing relation to the wall of the tubular portion 38 and its closed right end slidable within the inner body section bore 54 to form a fluid chamber 52 at the left side of the valve member.

Shutoff valve member 26 is movable between a normal open position shown in full lines in FIG. 1 and a closed position shown in broken lines. In the open position of the valve member, fluid may flow freely from the outlet chamber 36 to the valve outlet 16. In the closed position of the valve member, a valve face 62 about the closed end of the member engages a valve seat 64 about the valve outlet 16 to close the outlet. As will be explained presently, the valve member is movable from its open position to its closed position by the control flow into the fluid chamber 52. Acting between the shoulder 60 of the valve member and a shoulder within the inner body section 32 about its bore 54 is a spring 65 for urging the valve member to its open position.

Flow splitting and proportioning means 22, hereafter referred to simply as proportioning means, comprises an outer flow metering valve sleeve 66 extending coaxially through the end member 46 of the inner body section 32 and an inner flow metering valve sleeve 68 slidable in the outer sleeve. The left end of the outer sleeve, as it is seen in FIG. 1, extends a distance beyond the end member 46 into the chamber 44 and has an external shoulder 70 which abuts the end member to position the outer sleeve axially relative to the inner body section. The outer valve sleeve 66 has ports 72 through which fluid entering through the inlet 14 can flow from the valve inlet 14 to the flow space 42 and then through this space to the valve outlet 16. Fluid flow which thus occurs from the valve inlet, through the flow space 42, to the valve outlet constitutes the main fluid flow through the valve. The end edge 74 of the inner valve sleeve is movable across these ports from left to right in FIG. 1 during righthand movement of the valve sleeve by the pressure of the incoming fluid entering the valve inlet to increase the effective area of and hence the main flow through the ports. The inner valve sleeve is urged in the opposite direction to its solid line normal position of FIG. 1, to reduce the effective area of and hence main flow through the ports 72 and finally close the ports, by a spring 76 acting between an annular shoulder 78 within the outer valve sleeve 66 and an annular shoulder about the inner valve sleeve 68. It will be seen that both valve sleeves extend coaxially into the interior of the shutoff valve member 26.

The flow proportioning means 22 further comprises a flow metering valve rod 82 extending coaxially through the inner valve sleeve 68. This rod is fixed to the valve body 12 in the manner described below. Suffice it to say at this point that the valve rod is adjustably fixed in position in the valve body 12. At right end of this valve rod in FIG. 1 is a longitudinal slot 84 which is tapered in depth and opens through the end of the rod. As will be explained presently, the control fluid flow in the valve occurs through the slot 84 into the shutoff valve chamber 52 at the left side of the shutoff valve member 26 to move the member toward closed position. Thus, the shutoff valve member is essentially a piston on which the pressure of the control flow fluid acts to move the valve member to closed position. The right end of the inner valve sleeve 68 contains a coaxial bore 86 which slidably receives the slotted right end of the valve rod and has an inner edge 87 which moves along the rod slot 84 to control the effective area of and hence control fluid flow through the slot into the shutoff valve chamber 52. The proportioning valve spring 76 urges the movable valve sleeve 68 to the left in FIG. 1 to its normal position wherein this valve sleeve closes the outer valve sleeve ports 72 and covers all or at least a major portion of the valve rod slot 84, depending upon the axial position to which the rod is adjusted, as explained below.

From this description of the flow proportioning means 22 it will be understood that the end edge 74 of the movable valve sleeve 68 and the edges of the ports 72 in the fixed valve sleeve 66 form variable main flow metering ports 72a (FIG. 4) bounded by the sleeve and port edges and through which the main fluid flow occurs from the valve inlet 14 to the valve outlet 16. These valve sleeve and port edges thus constitute main flow port boundary means which are relatively movable by movement of the valve sleeve 68 to vary the main fluid flow through the valve.

Similarly, the walls of the slot 84 in the valve rod 82 and the edge 87 of the movable valve sleeve 68 form a variable control flow metering orifice 84a (FIG. 2) bounded by the latter sleeve and slot walls and through which control fluid flow occurs from the valve inlet 14 to the shutoff valve chamber portion 52. These latter sleeve and slot walls constitute orifice boundary means which are relatively movable by movement of the valve sleeve 68 to vary the area of the control flow orifice 84a and thereby the control flow through the orifice from the valve inlet 14 to the shutoff valve 26.

Coaxially positioned within the inlet chamber 44 are a support spider 88 for the valve rod 82 and a ring 90 which are confined between the adjacent end of the outer valve sleeve 66 and a shoulder 92 within the inlet chamber about the fluid inlet 14. The spider has a projecting circular boss 94 at one side which fits snugly in the adjacent end of the outer valve sleeve. The ring 90 surrounds and seats against a shoulder 96 about the adjacent end of the outer valve sleeve. The spider 88 is radially spaced from the surrounding circumferential wall of the inlet chamber 44 to form therebetween an annular space 98. The ring 90 has seal rings which seal the ring to both the outer valve sleeve 66 and the circumferential inlet chamber wall, as shown.

Valve rod 82 has three threadedly joined sections 82a, 82b, 82c. Section 82a contains the valve slot 84. Section 82b is a temperature compensation section whose characteristics and function will be explained later. Section 82c is a threaded section which is threaded in the spider 88. This threaded section serves to both secure the valve rod 82 to the spider and permit axial adjustment of the rod by a screwdriver inserted through the valve inlet 14 into an end slot 100 in the section.

Coaxially positioned within the annular space 98 about the spider 88 is an annular check valve member 102. Acting between this check valve member and the inlet chamber shoulder 92 is a spring 104 which urges the valve member into fluid sealing contact with the ring 90 to close fluid ports 106 extending through the ring. The ring 90, the valve member 102, and its spring 104 together constitute a check valve 108 which permits flow through the ring ports 106 only in the direction of the valve inlet 14. The spider 88 has fluid passages 110 which open axially through opposite sides of the spider to communicate the valve inlet 14 axially to the interior of the inner valve sleeve 68 and radially to the surrounding annular space 98.

The outer valve sleeve 66 contains circumferentially spaced vent ports 112 opening to an internal circumferential recess 114 in the surrounding end member 46. Recess 114 opens to the chamber 44. The inner valve sleeve 68 uncovers the ports 112 when in its normal position and covers these ports during right hand movement of the valve sleeve.

The operation of the capacity fuse valve 10 will now be explained in connection with FIG. 6. With no fluid delivery to the valve inlet 14, the shutoff valve member 24 is held open by its spring 65 and the inner valve sleeve 58 is held in its normal position by its spring 76. Actuation of the control means C to connect the fluid source S to the valve delivers fluid under pressure to the valve inlet. The entering fluid urges the inner valve sleeve 68 to the right, thereby opening and progressively and proportionally enlarging the main flow metering ports 72a and control flow metering orifice 84a and covering the vent ports 112. The fluid entering the fuse valve then flows through the main flow metering ports 72a and control flow metering orifice 84a and is thereby split into two streams or flows which are the main and control flows mentioned earlier. The main flow passes through the main flow metering ports 72a and the flow passage 18 to the valve outlet 16. The control flow passes through the flow metering orifice 84a into the shutoff valve chamber 52. The ratio of the total effective area of the metering ports to the effective area of the metering orifice, and hence also the ratio of the main flow rate to the control flow rate, remain constant throughout the range of movement of the inner metering valve sleeve 68.

If the fluid inflow rate through the valve inlet 14 remains constant, the inner valve sleeve 68 will assume an equilibrium position in which (a) the opposing fluid and spring forces acting on the valve sleeve are balanced, (b) the effective areas of the main flow metering ports 72a and control flow metering orifice 84a are such that the main flow and control flow have a combined flow rate equal to the constant fluid inflow rate, and (c) the fluid pressure (P1) in the valve inlet remains constant. More specifically, during its passage from the valve inlet 14 into the shutoff valve chamber 52, the control flow undergoes a small pressure drop from the inlet pressure P1 to a somewhat lower pressure P2 in the latter valve chamber. The inner valve sleeve 68 is positioned axially by the opposing forces of the inlet pressure P1, which urges the inner sleeve in a direction to enlarge the main flow metering ports 72a and control flow metering orifice 84a, and the control flow pressure P2 and spring 76, which urge the inner valve sleeve in the opposite direction to reduce the metering ports and orifice. The valve sleeve 68 assumes a position in which these opposing forces are balanced. The control flow pressure P2 also urges the shutoff valve 24 toward its closed position. During passage of the main flow from the valve inlet 14 to the valve outlet 16, it undergoes a small pressure drop from the inlet pressure P1 to a somewhat lower pressure P3 at the valve outlet 16 such that the pressure P3 and the spring 65 produce on the shutoff valve 24 a combined force opposing but slightly less than the force produced by the control flow pressure P2. Accordingly, the shutoff valve is moved toward its closed position by the resulting pressure differential across this valve. The shutoff valve eventually closes to limit the main flow through the valve to a total main flow volume (main flow valve closure volume) proportional, by the same ratio as the main and control flows, to the control flow volume required to close the shutoff valve (control flow valve closure volume).

Assume now that the rate of fluid delivery to the valve is reduced. This results in a momentary reduction in the valve inlet pressure P1 and a resulting momentary imbalance of the opposing forces on the inner valve sleeve 68 which moves the inner valve sleeve to the left to reduce the main flow ports 72a and control flow orifice 84a and thereby proportionally reduce the main and control flow rates. The inner valve sleeve assumes a new equilibrium position wherein the opposing pressure and spring forces on the sleeve are again in balance which occurs when the combined reduced main and control flow rates equal the reduced fluid inflow rate to the valve. An increase in the fluid inflow rate to the valve has the opposite effect of momentarily increasing the inlet pressure P1 and effecting right hand movement of the inner valve sleeve 68 to proportionally enlarge the main flow metering ports 72a and control flow metering orifice 84a and thereby proportionally increase the main and control flow rates The inner valve sleeve assumes a new equilibrium position wherein the opposing pressure and spring forces on the sleeve are again in balance which occurs when the combined increased main and control flow rates equal the increased fluid inflow rate to the valve. Thus, the main flow metering port area and control flow metering orifice area are proportionally varied in response to changes in the valve inlet pressure P1 and hence in response to changes in the fluid inflow rate to the valve in such a way as to maintain a substantially fixed ratio between the main flow rate and control flow rate, and hence a substantially constant control flow valve closure volume and main flow valve closure volume throughout a range of fluid inflow rates for which the valve is designed.

It is now evident that the flow proportioning means 22 of the capacity fuse valve 10 comprises, in effect, a stationary valve means, which includes the outer stationary valve sleeve 66 and the tapered valve rod 88, and a movable valve means, which is the inner movable valve sleeve 68. This proportioning means splits the fluid entering the valve into a main flow, which passes through the main flow metering ports 72a to the device to be actuated by the fluid (actuator R in FIG. 6), and a smaller control flow, which enters the shutoff valve chamber 52 through the control flow metering orifice 84a to urge the inner sleeve toward its normal position and move the shutoff valve piston 26 toward its closed position. The main and control flow rates are maintained in a fixed ratio throughout a range of fluid inflow rates Assuming that the interior of the valve remains filled with fluid when the valve is fully open, the control flow volume required to move the shutoff valve all the way to its closed position and thereby close the capacity fuse valve 10 (control flow valve closure volume) is the displacement volume of the shutoff valve. This displacement volume substantially equals the volume of chamber 52 minus the interior volume of the cup-shaped shutoff valve when the shutoff valve is in its fully closed position. The maximum main flow volume which can pass through the valve from the start of flow to closure of the valve is determined by the relative flow rates of the main and control flows and the control flow valve closure volume. The main and control flow rates are in a fixed ratio determined by the flow proportioning means 22. The threaded connection 82c between the valve rod 82 and the spider 88 provides means for adjusting this main/control flow ratio by rotation of the valve rod 82 which acts to vary the area of the control flow metering orifice 84a relative to the area of the main flow metering ports 72a. The valve rod may be adjusted so that the main flow ports open before, simultaneous with or after the control flow orifice.

Thus, the capacity fuse valve of the invention may be constructed and arranged, by properly proportioning the main and control flows and sizing the shutoff valve piston displacement volume, to pass only a predetermined maximum main flow volume (main flow valve closure volume) from the valve inlet 14 to the valve outlet 16 or, stated another way, to close in response to passage of the main flow valve closure volume through the valve from its inlet 14 to its outlet 16. In the particular application of FIG. 5, the valve is designed so that its main flow valve closure volume is slightly greater than the fluid volume required to operate the actuator piston P through its full stroke. In this way, the capacity fuse valve permits normal operation of the actuator R while preventing fluid loss in the event of a leak or rupture downstream of the fuse valve.

Once the shutoff valve member 24 closes to cut off main fluid flow through the fuse valve 10, it remains closed until the valve inlet 14 is vented to the low pressure receiver L in FIG. 6. When the valve member thus closes, fluid pressures across the inner valve sleeve 68 equalize. The inner valve sleeve is then urged toward its normal position by its spring 76 until the control flow orifice 84a closes. During this spring return of the inner valve sleeve, fluid is displaced from the left side of the inner sleeve to the right side of the sleeve through the control flow orifice 84a until it closes.

Venting of the valve inlet 14 to the low pressure receiver L permits full return of the inner valve sleeve 68 to its normal position by its spring 76. During this return, the valve sleeve uncovers the outer valve sleeve vent ports 112 to permit reopening of shutoff valve member 24 by its spring 65. Leftward opening movement of the shutoff valve member displaces fluid from the shutoff valve chamber 52 to the right side of the valve member through the outer sleeve vent ports 12, passage 114, flow space 44, and passages 42, 45.

It will now be understood that actuation of the control means C in FIG. 6 to disconnect the fuse valve inlet 14 from the fluid pressure source S and connect the inlet to the low pressure receiver L at any time during fluid flow through the capacity fuse valve 10, permits displacement of fluid from the left or inlet side of the inner valve sleeve 68 to the receiver and thereby rapid return of the inner valve sleeve to its normal position by its spring 76, followed by reopening of the shutoff valve member 24 by its spring 65. If a leak exists downstream of the fuse valve, the shutoff valve member 24 will remain closed until the control means C is actuated to disconnect the fluid source S from the fuse valve inlet 14 and connect the low pressure fluid receiver L to the inlet.

In at least some of applications, the present capacity fuse valve may be required to accommodate reverse fluid flow through the valve, that is fluid flow from the valve outlet 16 to the valve inlet 14. FIG. 6 illustrates one such application. Operation of the actuator R in FIG. 6 involves extension of the actuator piston P by main fluid flow from the fluid pressure source S, through the capacity fuse valve 10, to the actuator and retraction of the piston by a spring or other opposing force. Retraction of the piston occurs after opening of the shutoff valve member 24 by connection of the fuse valve inlet 14 to the low pressure fluid receiver L, as discussed above, and produces reverse fluid flow through the fuse valve 10 from its outlet 16 to its inlet 14. This reverse flow occurs from the valve outlet 16, through the passages 45, 42, inlet chamber 44, check valve 108, and valve inlet 14 to the receiver L.

As noted earlier, the capacity fuse valve of the invention is designed to operate accurately over a relatively wide range of fluid delivery rates and pressure to the valve inlet 14. That is to say, the fuse valve is designed to provide a main flow valve closure volume that remains substantially constant over the entire operating range of the valve. This requires that the main flow rate through the main flow metering ports 72a to the valve outlet 16 and the control flow rate through the control flow metering orifice 84a to the shutoff valve chamber 52 remain in a predetermined fixed ratio from the lowest flow rate to the highest flow rate of the valve operating range. To this end, the flow proportioning means 22 of the fuse valve 10 is so constructed and arranged that (a) the total effective area of the main flow metering ports 72a and the effective area of the control flow metering orifice 84a remain in a predetermined fixed ratio over the entire valve operating range from the minimum flow rate to the maximum flow rate, and (b) the areas of the main flow metering ports 72a and control flow metering orifice 84a vary progressively from predetermined minimum areas which provide the desired main flow/control flow ratio and thereby the desired main flow valve closure volume at the lowest flow rate to be accommodated to predetermined maximum areas which provide the same main flow/control flow ratio and main flow valve closure volume at the highest flow rate to be accommodated. As explained earlier, this flow ratio is adjustable by rotating the valve rod 82 to position the rod axially relative to the inner valve sleeve 68 independently of the relative positions of the valve sleeves 66, 68.

Temperature compensation may be essential in fuse valves according to the invention which are intended for high precision hydraulic applications that demand extremely precise control of the main hydraulic flow volume through the valves. Thus, the viscosity of hydraulic fluid varies inversely as a logarithmic function of fluid temperature, decreasing logarithmically as the temperature increases and increasing logarithmically as the temperature decreases. The main fluid flow rate through the main flow metering ports 72a to the valve outlet 16 and the control fluid flow rate through the control flow orifice 84a into the control flow measuring chamber 52a, in turn, vary inversely with the fluid viscosity, and hence directly with the fluid temperature, increasing as the fluid temperature increases and decreasing as the fluid temperature decreases.

Increasing the control flow rate through the orifice 84a into the control flow measuring chamber 52 in response to increasing fluid temperature reduces the time required to fill the chamber and close the valve and thereby correspondingly reduces the main flow volume through the valve. Decreasing the control flow rate into the chamber 52 in response to decreasing fluid temperature has the opposite effect of increasing the main flow volume through the valve. While the fluid-temperature-induced changes in the main flow rate through the main flow metering ports 72a may counteract to some extent the control flow volume changes caused by the temperature-induced changes in the control flow rate (for example, increased main flow rate through ports 72a caused by increasing fluid temperature will tend to compensate for more rapid valve closure due to increasing fluid temperature), the effect of the temperature-induced control flow changes on main flow volume may not be totally counteracted and eliminated because of the greater effect of fluid viscosity changes on the control flow rate through the flow orifice 84a and hence on the main flow volume than on the main flow rate through the ports 72a. Accordingly, the main flow valve closure volume of the capacity fuse valve 10 may vary in response to fluid temperature changes unless the valve is temperature compensated. According to an important feature of the invention, the fuse valve 10 embodies fluid temperature compensation means for eliminating such fluid temperature induced changes in the main flow closure volume.

The temperature responsive section 82b of the valve rod 82 provides a primary fluid temperature responsive compensation means for adjusting the area ratio of the main flow metering ports 72a and control flow orifice 84a and thereby the main/control flow ratio in response to fluid temperature changes. To this end the rod section 82b comprises a machined hard plastic such as Teflon or Nylon which has a known, relatively high coefficient of thermal expansion. Increasing fluid temperature causes this rod section to expand and correspondingly reduce the effective area of the control flow orifice 84a relative to the area of the main flow ports 72a and thereby the control flow rate through the orifice into the control flow measuring chamber 52. This increases the time required to fill the chamber portion 52a and close the valve and thereby also the main flow valve closure volume of the valve. Contraction of the rod section 82b in response to decreasing fluid temperature has the opposite effect of increasing the effective control orifice area and control flow rate into the flow measuring chamber 52 and correspondingly reducing the time required to fill the chamber 52 and close the valve and hence also the main flow valve closure volume of the valve.

The temperature compensation means of the fuse valve 10 comprises secondary fluid temperature compensation means 118 which provides additional fluid temperature compensation and enhances the performance, accuracy, and controllability of the fuse valve. This secondary temperature compensation means comprises a secondary orifice member 120 containing a secondary orifice 122 which opens at its left end in FIG. 1 to the valve chamber 44. The right end of the secondary orifice 122 communicates with the shutoff valve chamber 52 through an annular flow space 124 formed between the shutoff valve member 24 on the one hand and the end member 46 and outer valve sleeve 66 on the other hand.

With regard to the performance, accuracy, and controllability enhancement function of the secondary orifice 122, it will be recalled that the fluid flow into the shutoff valve chamber 52 occurs through the primary orifice 84a. The faster fluid flow occurs through this orifice, the greater will be the performance, accuracy, and controllability of the fuse valve.

The secondary orifice 122 permits some fluid to pass outwardly from the shutoff valve chamber portion 52, thus increasing the inflow rate through the primary orifice 84a. The more fluid which passes out through the secondary orifice 122, the greater the inflow rate through the primary orifice 84a since the fluid outflow through the secondary orifice must be supplied by inflow through the primary orifice.

The secondary orifice 122 compensates for fluid temperature in the following manner. Increasing fluid viscosity at low (below normal) temperatures slows control fluid outflow through the orifice 122 from the shutoff valve chamber 52 to compensate for the reduced control fluid inflow rate to the chamber through the primary orifice 84a resulting from such viscosity increase in a manner which tends to maintain a relatively constant effective flow rate into the chamber and thereby the desired maximum main flow volume through the valve. Decreasing fluid viscosity at high (above normal) temperatures has the opposite effect of increasing the rate of control fluid outflow from the valve chamber through the secondary orifice to compensate for the increased inflow to the chamber through the primary orifice in a manner which again maintains a relatively constant effective flow rate into the chamber.

According to the present invention, the primary and secondary temperature fluid compensation means 82, 118 are designed to have temperature responses such that the main and control flow rates will have a relatively fixed ratio regardless of fluid temperature, whereby the valve will have a relatively constant main flow valve closure volume regardless of both fluid temperature and incoming flow rate.

The modified capacity fuse valve 200 of FIGS. 7-9 has an elongate generally tubular body 202 including outer and inner, threadedly joined tubular sections 204, 206 containing a fluid inlet 208 and a fluid outlet 210, respectively. Inner body section 206 has a left-hand (as viewed in FIG. tubular end portion 212 which is radially spaced from the surrounding wall of the outer body section 204 to define therebetween an annular fluid passage 214 communicating to the outlet 210 through passages 215 in the body section 204. At the left end of and coaxial with this tubular end portion is a sleeve 216 having a cylindrical hub-like midportion 218 which is pressed into the tubular end portion to engage an external shoulder 220 on the sleeve with the end of the tubular portion. The right end 222 of the sleeve 216 is reduced in diameter and extends concentrically through the tubular portion. The diametrically larger left end 224 of the sleeve extends to the left into sealing contact with a sealing gasket 226 about the valve inlet 208. About the left sleeve end 224 near its center is an external annular shoulder 228 disposed in circumferential fluid sealing relation with the surrounding wall of the outer valve body section 206. Sleeve end 224 is radially spaced from the surrounding wall of the outer body section 206 at the right of the shoulder 228 to provide an annular space 230 which communicates with the annular passage 214, and at the left of the shoulder 228 to provide an annular space 232.

The larger left end 224 of the sleeve 216 contains ports 234 and 236 and functions as a fixed flow metering valve sleeve. Ports 234 open to the annular space 230 at the right of the sleeve shoulder 228 and through this space to the fluid passage 214. Ports 236 open to the annular space 232 at the left of the sleeve shoulder 228. Within this latter space 232 is an annular valve member 238 which is urged by a spring 240 into sealing contact with the shoulder 228 to close fluid passages 242 extending through the shoulder between the annular spaces 230, 232. The valve member 238 and spring 240 constitute a check valve 244 which permits flow through the passages 242 only in one direction, from the space 230 to the space 232.

Slidable within and disposed in fluid sealing relation to the flow metering valve sleeve 224 is an inner movable flow metering valve sleeve 246 containing left hand ports 248 and an external circumferential recess 250. This recess forms about the exterior of the inner sleeve a right hand circumferential flow metering land 252 and a left hand circumferential sealing land 254 which are disposed in fluid sealing relation with the inner surface of the outer flow metering valve sleeve 224. Extending transversely across the interior of the inner valve sleeve 246 is a wall 256 containing a central opening 258. This opening is tapered to an increasing diameter toward the valve inlet 208 and has a narrow inner edge 260.

The inner metering valve sleeve 246 is axially movable within the outer metering valve sleeve 224 between its left hand full line position and its right hand broken line position of FIG. 7. A spring 261 urges the inner valve sleeve to its left hand solid line position which is the normal position of the sleeve.

Extending coaxially through the sleeves 216 and 246 is a flow metering valve rod 262. This valve rod has a threaded right end 264 threaded in the smaller diameter right end 222 of the sleeve 216, a cylindrical left end 266, an adjacent conically tapered portion 268 which tapers to a decreasing diameter toward the threaded right end of the rod, and a stem portion 270 between this tapered portion and the threaded end of the rod. The left cylindrical end 266 of the valve rod 262 is coaxially disposed within and in fluid sealing relation to the edge 260 of the central opening 258 in the inner metering valve sleeve 246 when this sleeve occupies its left hand normal position.

Slidable within the inner valve body section 206 is a cup-like shutoff valve member 274. This valve member is a piston having a cup-shaped body 276 with an external annular shoulder 278 about its open end. The tubular right end of the valve member slides in a coaxial bore 280 in the inner body section 206 which opens to an outlet chamber 281 communicating the valve body passages 215 to the fuse valve outlet 210. The shutoff valve shoulder 278 slides in the tubular end portion 212 of the inner body section. The smaller diameter end 222 of the outer metering valve sleeve 216 extends coaxially through the shutoff valve member 274 in radially spaced relation to the member to form therebetween an annular flow passage 282. This annular passage communicates leftward to the interiors of the metering valve sleeves 216, 254 through ports 284 in the outer metering valve sleeve 216. The annular passage 282 opens rightward to a chamber 272 at the inlet side of the shutoff valve member 274.

The shutoff valve member 274 is axially movable to the left in the drawings to its solid line position wherein the member abuts hub-like portion 218 of the outer valve sleeve 216. The shutoff valve member is movable to the right in the chamber 282 to its broken line position on FIG. 7 wherein a beveled valve face 286 on the member seats against an annular valve seat 288 about the valve outlet 210 to block fluid flow through the outlet Accordingly, the solid line position of the shutoff valve member 274 is its open position and the broken line position is its closed position. A spring 290 urges the valve member to its open position.

The operation of the capacity fuse valve 200 is generally similar to that of the capacity fuse valve 10. Thus, in the absence of fluid delivery to the valve inlet 208 from the fluid pressure source S in FIG. 6, the inner movable flow metering valve sleeve 246 is retained in its left hand normal position of FIG. 7 by its spring 261. In this position of the valve sleeve 246, its flow metering land 252 closes the flow metering ports 234 in the outer metering valve sleeve 224 to main fluid flow from the valve inlet 208 to the valve outlet 210. The edge 260 of the central opening 258 in the valve sleeve 246 is disposed in fluid sealing relation with the cylindrical left end 266 of the flow metering rod 262. The shutoff valve member 274 is retained in its left hand open position of FIG. 7 by its spring 290, wherein the valve outlet 210 is open.

When fluid under pressure is supplied to the valve inlet 208, the fluid pressure moves the inner movable metering valve sleeve 246 to the right in FIG. 7 against the bias of its spring 261. During this rightward movement of the valve sleeve, its flow metering land 252 uncovers the flow metering ports 234 in the outer metering valve sleeve 216 to form variable main flow metering ports 234a (FIG. 8) between and bounded by the land and the port edges which thus form boundary means for the ports. Also during such valve sleeve movement, the edge 260 of the valve sleeve central opening 258 moves from the cylindrical valve rod end 266 to the tapered rod portion 268 to form an annular control flow metering orifice 258a (FIG. 9) between and bounded by the edge and the tapered rod portion which form boundary means for the annular orifice. These boundary means are relatively adjustable by movement of the valve sleeve to vary the areas of the main flow metering ports 234a and the control flow metering orifice. Main fluid flow occurs from the valve inlet 208 to the valve outlet 210 through the main flow metering ports 234a and the annular passage 214. Control fluid flow occurs from the valve inlet 208, through the annular control flow metering orifice 258a, outer valve sleeve ports 284, and annular passage 282 into the shutoff valve chamber 272 at the inlet side of the shutoff valve member 274.

This control fluid flow urges the shutoff valve member 274 toward its closed position against the bias of its spring 290. Engagement of the shutoff valve member with its valve seat 288 in its closed position closes the fuse valve to main fluid flow from its inlet 208 to its outlet 210. As in the capacity fuse valve 10, once shutoff valve member 274 closes to cut off main fluid flow through the fuse valve 200, it remains closed until the valve is vented, and the control fluid flow through the control flow metering orifice 258a ceases so that the fluid pressures across the inner valve sleeve 246 equalize. The inner valve sleeve is then returned toward its normal position by its spring 246 until the control flow orifice 258a closes. During this spring return of the inner valve sleeve, fluid is displaced from the left side of the inner sleeve to the right side of the sleeve through the control flow orifice 258a.

Venting of the valve inlet to the fluid receiver L (FIG. 6) permits spring return of the inner valve sleeve to its normal position. During this return of the inner valve sleeve 246 to its normal position, the right hand edge of its land 252, as viewed in FIG. 7, uncovers the right hand portion of the outer valve sleeve ports 234 to communicate the shutoff valve chamber 272 to the flow space 214 through the ports 284 and the uncovered right hand portions of the ports 234. This uncovering of the ports 234 permits reopening of the shutoff valve member 274 by its spring 290 during which the shutoff valve member displaces fluid from the shutoff valve chamber 272 to the right side of the valve member through the outer ports 284, 234, flow space 214, and passages 215. Thus, as in the fuse valve 10, actuation of the control means C in FIG. 6 to disconnect the fuse valve inlet 208 from the fluid pressure source S and connect the inlet to the low pressure receiver L at any time during fluid flow through the capacity fuse valve 200 permits displacement of fluid from the left or inlet side of the inner valve sleeve 246 to the receiver and thereby rapid return of the inner valve sleeve to its normal position by its spring 261 followed by reopening of the shutoff valve member 274 by its spring 290. If a leak exists downstream of the fuse valve, the shutoff valve member 274 will remain closed until the control means C is actuated to disconnect the fluid source S from the fuse valve inlet 208 and connect the low pressure fluid receiver L to the inlet.

Capacity fuse valve 200, like the fuse valve 10, permits reverse fluid flow through the valve. This reverse flow occurs from the valve outlet 210, through the passages 215, 214, ports 242, check valve 244, and valve inlet 208 to the receiver L. The capacity fuse valve 200 like the fuse valve 10 is also designed to operate accurately over a relatively wide range of fluid delivery rates. To this end, its valve sleeve 216, valve rod 262, and its valve sleeve 246 constitute stationary and movable valve members, respectively, forming a main/control flow proportioning means which is so constructed and arranged that (a) the total effective area of the main flow ports 234a and the effective area of the control flow orifice 258a remain in a predetermined fixed ratio over the entire valve operating range from the minimum flow rate to the maximum flow rate, and (b) the areas of the main flow metering ports 234a and control flow metering orifice 258a vary progressively and proportionally from predetermined minimum areas which provide the desired main flow/control flow ratio at the lowest flow rate to be accommodated to predetermined maximum areas which provide the same main flow/control flow ratio at the highest flow rate to be accommodated. This ratio is adjustable to vary the main flow valve closure volume by inserting a screwdriver through the valve inlet 208 into a slot 295 in the adjacent end of the flow metering valve rod 262 and rotating the rod to adjust it axially and thereby adjusting the control flow metering orifice 258a independently of the main flow metering ports 234a. It will be observed that the valve rod is adjustable to effect opening of the main flow metering ports before, simultaneous with, or after opening of the control flow metering orifice.

Thus, in the modified capacity fuse valve 200 like the first described valve 10, the valve sleeves 216, 246 and the valve rod 262 constitute flow control means including flow proportioning means for splitting the incoming fluid entering the valve inlet 208 into a main flow which proceeds to the valve outlet 210 and a control flow whose flow rate has a fixed but manually adjustable ratio relative to that of the main flow. The shutoff valve 274 and its chamber constitute means for indirectly measuring the total main flow volume by measuring the control flow volume and for cutting off main flow through the valve in response to a predetermined total control flow volume (control flow valve closure volume) and hence main flow volume (main flow valve closure volume).

The modified capacity fuse valve 300 of FIGS. 10-19 has an elongate generally tubular body 302 including outer and inner, threadedly joined tubular sections 304 and 306 and containing a fluid inlet 308 and a fluid outlet 310, respectively. Coaxially disposed within the outer body section 302 is a sleeve 312. The right hand end (as viewed in FIG. 10) of this sleeve is fixed within the right end of the outer body section and contains an axial opening 315 to the outlet 310. A seal ring 314 seals the sleeve to the outer body section about the opening 315.

Sleeve 312 is radially spaced from the surrounding wall of the outer body section 304 to define therebetween an annular fluid passage 316 communicating to the outlet 310 through passages 318 in the right end of the sleeve. At the left hand open end of the sleeve 312 is an end member 320 having an annular shoulder 321 fixed within the sleeve and a skirt 324 extending concentrically into the sleeve. The interior of the sleeve 312 opens at its right end to the valve outlet 310 through the sleeve end opening 315.

Slidable within the sleeve 312 in surrounding relation to the skirt 324 of the end member 320 is a cup-like shutoff valve member 326. This valve member is a hollow cup-like piston having a tubular body 328 with an external annular shoulder 330 about its open end. Shoulder 330 slides within and is sealed to the surrounding sleeve 312 to form a chamber 322a at the inlet side of the shutoff valve member. A spring 332 urges the valve member 326 to the left in FIG. 10 to its open position shown, wherein the valve member abuts the shoulder 321 of the sleeve end member 320. The shutoff valve member is movable to the right in FIG. 10 to a closed position wherein an annular valve face 334 about the right end of the valve member engages a valve seat 336 about the end outlet opening 315 in the sleeve.

Extending coaxially through and sealed to the valve body sleeve end member 320 is an outer fixed metering valve sleeve 338 and an inner movable metering valve sleeve 340 slidable within the outer sleeve. The outer valve sleeve 338 has an external shoulder 342 abutting the valve body sleeve end member 320 and an external shoulder 344 abutting a coaxial ring 346 fixed within and sealed to the inner valve body section 306. The outer valve sleeve is thereby fixed within the valve body 302 with the left end of the outer sleeve extending across the space 347 between the end member 320 and ring 346 which opens to the annular flow space 316.

The inner valve sleeve 340 has three portions 348, 350, and 352 of differing diameters. The left hand largest diameter sleeve portion 348 slides within the outer valve sleeve 338. The valve sleeve midportion 350 has a smaller diameter to provide an annular clearance between this sleeve portion and the surrounding fixed valve sleeve 338 and an annular shoulder 354 about the inner sleeve. On the right hand smallest diameter portion 352 of the inner valve sleeve is threaded a sleeve 356 having an internal shoulder 358 at its right end. Acting between the inner movable valve sleeve shoulder 354 and an internal shoulder 360 within the right end of the outer fixed valve sleeve 338 is a spring 362 for urging the inner sleeve to the left to its normal position of FIG. 10 wherein the left end of the valve sleeve abuts the ring 346.

Coaxially positioned within the threaded sleeve 356 between its internal shoulder 358 and the adjacent end of the inner valve sleeve 340 is an annular orifice member or ring 364 (FIG. 12) having a central opening bounded by an edge 366. A spring 368 acting between the inner valve sleeve 340 and the orifice ring 364 urges the ring to the right in FIG. 12 to its illustrated normal position of abutment against the internal shoulder 358 on the threaded sleeve 356.

The left end of the outer fixed valve sleeve 338 contains flow metering ports 370 which open to the surrounding annular space 347 and are closed by the inner movable valve sleeve 340 when the latter occupies its normal position of FIG. 10. During right hand movement of the movable valve sleeve 340 from its normal position to its right hand limiting position, the end edge 340a of the movable valve sleeve uncovers the ports 370 to form variable main flow metering ports 372 (FIG. 11) through which fluid flow occurs from the valve inlet 308 to the valve outlet 310. These main flow metering ports are bounded by the movable sleeve edge 340a and the edges of the fixed sleeve ports 370 which thus form boundary means of the main flow ports that are relatively movable to vary the port areas by movement of the movable valve sleeve 340. The outer valve sleeve 338 also contains several ports 338a spaced circumferentially about the sleeve and opening to an internal circumferential recess 338b in the surrounding member 320. Recess 338b opens through the left or inlet side of the member 320 into the annular space 347 about the left end of the outer valve sleeve 338.

Extending coaxially through the inner movable valve sleeve 340 and its orifice ring 364 is a valve rod 374 having a cylindrical portion 376 and a tapered end portion 378 with a flat tapered surface 378a at one side. When the movable valve sleeve 340 occupies its position of FIG. 10, the cylindrical valve rod portion 376 is situated within and in fluid sealing relation to the boundary edge 366 of the central opening in the orifice ring 364. Right hand movement of the valve sleeve 340 moves the orifice ring from the cylindrical valve rod portion 376 onto the tapered rod portion 378 to form a primary orifice 380 between and bounded by the boundary edge 366 and the valve rod tapered surface 378a. The cross section of the tapered portion 378 of the valve rod at its right hand tip end in FIG. 15 is by design always slightly greater than one half of the rod overall circular cross section, which in turn centers the tapered end portion in the orifice ring opening when the orifice ring is positioned on the tapered rod portion. The boundary edge 366 and the valve rod tapered surface 378a form boundary means of the orifice 380 which are relatively movable by movement of the valve sleeve 340 to vary the orifice area.

At the left end of the valve rod in FIG. 10 is a nut assembly 382, shown in detail in FIGS. 15 and 16, which mounts the valve rod 374 in the valve body 302. This nut assembly comprises a generally rectangular nut 384 having threads 386 at its ends and a rectangular longitudinal recess 388 entering its right side in FIGS. 15 and 16. Fixed within the recess 388 on the central axis of the nut 384 is a generally tubular guide 390 which receives the adjacent left end of the valve rod 374 with a slightly loose fit. In the opposite side of the nut is a slot 392 to receive a screwdriver for rotating the nut, as will be explained shortly.

The valve rod 374 is secured to the nut assembly 382 by a unique primary fluid temperature compensation means 394 according to the invention which adjusts the valve rod endwise, and thereby the area of the primary orifice 380, in response to fluid temperature to enlarge the primary orifice 380 in response to decreasing fluid temperature, as will be explained presently. Temperature compensation means 394 comprises a pack 395 of temperature responsive bi-metallic thermal elements 396 and spacers 397 mounted on the end of the valve rod 374 between the bottom wall 388a of the nut recess 388 and the tubular guide 390. In the preferred valve embodiment illustrated, the thermal elements 396 are bi-metallic strips having a width and length slightly less than the width and length of the nut recess, as shown in FIGS. 15 and 16.

The thermal elements 396 and spacers 397 of the thermal element pack 394 have central apertures slidably receiving the adjacent end of the valve rod 374. This end of the rod has a reduced diameter threaded extremity 398 mounting a nut 400 for securing the element pack on the rod. The aperture in the outermost thermal element 396a of the pack, that is the left hand element in FIGS. 10, 15, 16 and 19, is sized to receive the threaded valve rod extremity 398. The apertures in the spacers and in the remaining thermal elements of the pack are sized to receive the adjacent cylindrical portion 376 of the valve rod. The thermal element pack is assembled on the valve rod with the left hand outermost thermal element 396a clamped by the nut 400 against the shoulder on the valve rod 374 at the juncture of its threaded extremity 398 and its adjacent full diameter portion 376 and with the opposite innermost right hand thermal element 396b seating against the valve rod guide 390. A spring 401 acts between the bottom of the recess 388 in the nut 384 and the adjacent left hand thermal element 396a of the thermal element pack 395 to urge the valve rod 374 and the thermal element pack 395 to the right in the drawings to the position of FIG. 15 wherein the right hand element 396 of the pack seats against the valve rod guide 390.

The nut assembly 382 is coaxially threaded in the inner valve body section or end cap 306 adjacent to the valve inlet 308. Because of the generally rectangular shape of the nut assembly, as viewed along the axis of the valve body 302, fluid flow passages 402 exist at opposite sides of the nut assembly through which fluid flow may occur from the valve inlet 308 to the inner movable valve sleeve 340.

Coaxially positioned within the inner valve body section 306 between the ring 346 and the nut assembly 382 is an annular check valve member 404. A spring 406 urges this check valve member to the right of its illustrated closed position wherein the valve member seats against the ring 346 to close flow ports 408 extending axially through the ring. The ring 346 and valve member 404 constitute a check valve 410 which permits flow through the ports 408 only in the direction of the valve inlet 308.

The valve preferably has an orifice member 412 secured to the end member 320 and containing a secondary orifice 414 which communicates to the shutoff valve chamber 322a through an annular flow space 416 between the shutoff valve 326 from space 416 between the shutoff valve 326 and the sleeve portion 324 of the end member. As explained below, the secondary orifice 414 provides a fluid temperature compensating function which supplements that of the fluid temperature compensation means 394.

Except for its temperature compensation operation of the modified capacity fuse valve 300 is generally similar to that of the earlier described capacity fuse valves of the invention. Thus, assuming the valve 300 is initially in its normal open condition of FIG. 10, the inner movable valve sleeve 340 will be held in its normal closed position by its spring 362. In this position, the sleeve covers the outer valve sleeve ports 370, the inner valve sleeve orifice ring 364 is situated about and in fluid sealing relation to the cylindrical portion 376 of the valve rod 374, and the main flow metering ports 372 and control flow metering primary orifice 380 are closed. The shutoff valve member or piston 326 is held open by its spring 332. The outer valve sleeve and the valve rod constitute a stationary valve member and the inner valve sleeve a movable valve member which together form main/control flow proportioning means.

When fluid under pressure is supplied to the valve inlet 308, the fluid flows through the passages 402 at opposite sides of the nut assembly 382 to the inner movable valve sleeve 340 and urges the sleeve to the right in the drawing against the bias of its spring 332. During this right hand movement, the valve sleeve 340 uncovers the outer valve sleeve ports 370 to form the main flow metering ports 372 through which, and the annular flow spaces 347, 316 and ports 318, main fluid flow occurs from the valve inlet 308 to the valve outlet 310. During its right hand movement, the inner valve sleeve 340 also covers the outer valve sleeve ports 338a and moves the orifice ring 364 from the cylindrical valve rod portion 376 to the tapered rod portion 378 to form the primary orifice 380 through which control fluid flow occurs from the valve inlet 308 to the shutoff valve chamber 322. The control fluid urges the shutoff valve member to the right toward its closed position of contact with its valve seat 336 to cut off main fluid flow through the valve.

Thus, the valve sleeves 338, 340 and the valve rod 374 constitute flow proportioning means for splitting the fluid entering the valve into a main flow and a control flow whose flow rates are maintained in a fixed ratio. The main flow passes through the main flow ports 372 to the valve outlet 310. The control flow passes through the primary orifice 380 to the shutoff valve chamber 322 for closing the shutoff valve member 326 upon passage of a predetermined main flow volume (main flow valve closure volume) through the valve. The ratio of the main and control flow rates and hence the main flow valve closure volume of the valve are adjustable within limits by rotating the nut assembly 382 to adjust it and the valve rod 374 axially relative to the movable valve sleeve 340. This adjustment effects relative adjustment of the primary orifice boundary means (orifice boundary edge 366 on the orifice ring 364 and tapered valve rod portion 378) to vary the area of the primary flow orifice 380 independently of the main flow ports 372 and thereby the main flow valve closure volume. The fluid temperature compensation means 394 also adjusts the control flow primary orifice 380 independently of the main flow ports 372 and thereby the ratio of the main and control flow rates in response to fluid temperature to maintain the main flow valve closure volume substantially constant throughout the temperature range over which the fuse valve is designed to operate.

All of the following actions occur in the fuse valve 300 in essentially the same way as explained in connection with the capacity fuse valve 10 of FIGS. 1–6: return of the inner flow metering valve sleeve 340 toward its normal position by its spring 362 in response to closure of the main flow shutoff valve member 326; reopening of the shutoff valve member 326 by its spring 332 in response to return of the inner valve sleeve toward its normal position if now leak exists downstream of the fuse valve; both return of the inner valve sleeve 340 to its normal position and reopening of the shutoff valve member 326 in response to cutting off the pressure fluid supply to the fuse valve inlet 308 and venting the inlet to a low pressure fluid receiver; and reverse fluid flow through the valve. Accordingly, no further explanation of these actions in connection with the capacity fuse valve 300 is necessary.

Returning now to the temperature compensation of the capacity fuse valve 300, the changes in fluid viscosity resulting from changes in fluid temperature vary the control flow rate through the control flow metering orifice 380 into the shutoff valve chamber 322 independently of the main flow metering ports 372 and hence independently of the main fluid flow rate through the fuse valve. Thus, increasing fluid viscosity caused by decreasing fluid temperature slows the control fluid flow through the primary orifice to the shutoff valve chamber, thereby increasing the time required to close the shutoff valve 326 and hence also the main flow volume through the valve before valve closure. Decreasing fluid viscosity caused by increasing fluid temperature has the opposite effect of decreasing the main flow volume through the valve before valve closure. While such temperature and viscosity changes also effect the main flow rate through the main flow ports 372 in a manner which tends to compensate for the control flow changes through the primary orifice 380, control flow through the secondary orifice is effected much more by viscosity changes than is primary flow through the main flow ports because of smaller area of the orifice and the fact that the main flow ports 372 are essentially sharp-edged ports. Fluid temperature changes thus tend to change the main flow valve closure volume which is the controlled fluid volume which the valve will deliver to a fluid receiver. The primary temperature compensation means 394 compensates for such fluid temperature effects.

Referring now in more detail to the temperature compensation means 394, the thermal element pack 395 of the valve may contain various numbers and arrangements of thermal elements 396 and spacers 397 and various spacer thicknesses depending upon the range and mode of temperature compensation desired. FIGS. 17, 18, and 19 illustrate two, four and six thermal element packs, respectively. The two thermal element pack of FIG. 17 contains a single pair 396a of thermal elements 396 and no spacers. The four thermal element pack of FIG. 18 has two pairs 396a of thermal elements separated by a spacer 397a and a spacer 397b between the two thermal elements of each pair. The six thermal element pack of FIG. 19 has three element pairs 396a separated by spacers 397a and a spacer 397b between the two thermal elements of each pair. Similarly, an eight thermal element pack will have four element pairs and spacers. As will appear from the following discussion, the number of thermal element pairs and the number, thickness, and arrangement of spacers in a thermal element pack for use in the present capacity fuse valve will be determined by the range and mode of temperature compensation desired. It will also be seen that the temperature compensation means of the invention comprises, in effect, a novel temperature responsive actuator which may be used for a variety of applications in addition to the present capacity fuse valve. The particular capacity fuse valve illustrated has a six thermal element pack 395 like that in FIG. 19 which is designed to compensate for low temperatures only, that is for fluid temperatures below some preselected normal operating temperature of the valve.

The thermal elements 396 are conventional bi-metallic strips which have a relatively high thermal coefficient material on one side H (high expansion side) and a relatively low thermal coefficient material on the opposite side L (low expansion side). These strips are constructed in such a way that they become flat at a preselected or predetermined temperature, which in the case of the present capacity fuse valve is its normal operating temperature. If the temperature of the thermal elements increases above this normal temperature, they bend toward and become concave on their low expansion sides L. If the temperature of the thermal elements decreases below the normal temperature, they bend toward and become concave of their high expansion sides H.

The thermal elements 396 of the illustrated thermal element packs for use in the illustrated capacity fuse valve 300 are arranged so that the high expansion sides H of the two elements of each thermal element pair 396a of the pack are innermost and face one another, and the low expansion sides L of the two elements are outermost. In a multi-pair thermal element pack, such as those of FIGS. 18 and 19, spacers 397a are located between the facing outer low expansion sides L of adjacent element pairs 396a. In the particular thermal element pack 395 embodied in the capacity fuse valve 300, a spacer 397b is located between the facing inner high expansion sides H of the two thermal elements of each thermal element pair 396a, although this may vary.

Consider now the two thermal element pack of FIG. 17. At normal temperature, these elements are flat and in face to face contact, as in FIG. 17a. Assume now that the temperature increases above normal. Under these conditions, the elements bend outwardly away from one another while their centers remain in face to face contact, as in FIG. 17b. If the temperature decreases below normal, the thermal elements bend or deflect inwardly toward one another. Since the elements were initially in contact, such inward deflection immediately causes progressive separation of the elements at their centers, as shown in FIG. 17c. From this description, it will be understood that if the two thermal element pack of FIG. 17 were installed in the capacity fuse valve 300 at normal fluid temperature with the valve rod 374 at some initial position wherein the primary orifice 380 is open and control fluid is flowing through the orifice to the shutoff valve chamber 322a, an increase in fluid temperature above normal causing the thermal elements 396 to bend outwardly, as in FIG. 17b, would have no effect on the valve rod position and hence no effect on the control fluid flow to the valve chamber. On the other hand, if the fluid temperature decreased below normal temperature, separation of the thermal elements at their centers, as in FIG. 17c, would retract the valve rod to the left in FIG. 15 and thereby enlarge the primary orifice to increase control fluid flow into the shutoff valve chamber 322a.

In the above situation, the thermal elements 396 were in face to face contact at normal temperature. As a consequence, the elements would commence leftward retraction of the valve rod 374 immediately upon dropping of the fluid temperature below normal, and the retraction distance of the rod would equal the separation of the centers of the elements at the particular low fluid temperature involved. This separation is twice the deflection of an individual thermal element measured parallel to the valve rod. Assume now that the thermal elements were separated by a spacer. This spacer would have no effect on the high (above normal) temperature response of the two thermal element pack. At low (below normal) temperature, inward deflection of the thermal elements would not cause leftward retraction of the valve rod until the elements had bent sufficiently to bring them into contact at their ends at some given low temperature. A further reduction in fluid temperature would cause retraction on the rod through a distance equal to the further separation of the thermal elements at their centers.

Consider now a multi-pair thermal element pack, such as the six thermal element pack 395 embodied in the valve 300. In this case, the adjacent thermal elements 396 of adjacent element pairs 396a would deflect toward one another at high temperatures. Accordingly, if these elements were allowed to contact one another, they would cause leftward retraction of the valve rod 374 at high temperatures in much the same way as the thermal elements in FIG. 17 do at low temperatures. This high temperature responsive of the multi-pair thermal element pack is eliminated by the spacers 397a which are sized in thickness to avoid contact of the thermal elements of adjacent element pairs to at least the highest temperature at which the valve is designed to operate. At low temperatures, the individual thermal element pairs 396a react in the same manner as discussed above in connection with FIG. 17. In such a multi-pair thermal element pack, however, the valve rod retraction effects of the several element pairs 396a are additive, and the retraction distance of the valve rod 374 equals the sum of the retraction distances contributed by the several pairs.

Consider now the effect of this thermal response of the thermal element pack 395 on the operation of the capacity fuse valve 300. Assume first that the fluid entering the valve is at the normal temperature for which the valve is to be set. The spring 401 in the nut assembly 382 then urges the thermal element pack and the valve rod 374 to the right in FIG. 15 to a position wherein the center of the right hand thermal element 396 of the pack abuts the valve rod guide 390. The valve rod 374 is then located in its normal temperature position. If the temperature of the incoming fluid increases above this normal temperature, its thermal elements 396 deflect as described above without moving the valve rod. On the other hand, in the entering fluid temperature decreases below the normal temperature, its thermal elements 396 deflect in a manner which retracts the valve rod to the left.

The capacity fuse valve 300 is designed and initially adjusted so that at a given normal fluid temperature, the valve will pass a predetermined controlled fluid volume (main flow valve closure volume) to the fluid receiver and then close. The temperature compensation means 394 responds to a decrease in fluid temperature below the normal temperature by retracting the valve rod 374 to the left in the drawings to increase the control fluid flow through the primary orifice 380 sufficiently to maintain the proper ratio between the main and control flows and thereby preserve the desired maximum main flow volume through the valve. As mentioned earlier, the temperature compensation means does not by design compensate for high temperatures, that is above normal temperatures.

The valve also includes secondary temperature compensation means comprising a secondary orifice member 412 extending from the body sleeve end member 320 into the space 347. This orifice member contains a secondary orifice 414 which communicates the valve space or chamber 347 to the shutoff valve chamber portion 322a through an annular flow space 416 between the shutoff valve member 326 and the end member 320. The secondary orifice provides both high temperature compensation and additional temperature compensation at low temperature and enhances the performance, accuracy, and controllability of the valve. With regard to performance, accuracy, and control enhancement of the valve by the secondary orifice 414, control fluid flow into the shutoff valve chamber portion 322a occurs via the primary orifice 380. The faster fluid moves across the tapered end portion 378 of valve rod 374, the greater is the performance, accuracy and controllability of the fuse valve.

The secondary orifice 414 allows some fluid to pass outwardly from the shutoff valve chamber portion 322a, thus increasing the inflow rate through the primary orifice 380. The more fluid which passes out through the secondary orifice 414, the greater the inflow rate through the primary orifice 380 since the fluid outflow through the secondary orifice must be supplied by inflow through the primary orifice.

The secondary orifice 414 compensates for fluid temperature in the following manner. Increasing fluid viscosity at low (below normal) temperatures slows control fluid outflow through the orifice from the shutoff valve chamber 322a to compensate for the reduced control fluid inflow rate to the chamber through the primary orifice 380 resulting from such viscosity increase in a manner which tends to maintain a relatively constant effective flow rate into the chamber and thereby the desired maximum main flow volume through the valve. Decreasing fluid viscosity at high (above normal) temperatures has the opposite effect of increasing the rate of control fluid outflow from the valve chamber through the secondary orifice to compensate for the increased inflow to the chamber through the primary orifice in a manner which again maintains a relatively constant effective flow rate into the chamber.

It will now be understood that the temperature compensation means 394 and the secondary orifice 414 provide low temperature compensation for the capacity fuse valve 300 and the secondary orifice 414 provides high temperature compensation for the valve. By appropriate selective placement and sizing of the spacers 397a and 397b in the low temperature compensation means 394 and appropriate sizing of the secondary orifice 414, these temperature compensating means may be designed to provide temperature compensation for the valve over various ranges and/or in various stepped and/or continuous modes.

Moreover, the temperature compensation means 394 of the invention is capable of many other uses in addition to providing temperature compensation in the present capacity fuse valve and is, in effect, general purpose temperature responsive actuator which may be arranged, by appropriate arrangement and thickness of the spacers, to exhibit a great variety of different temperature responses, both stepped and continuous, over virtually any temperature range. For example, the temperature compensation means or temperature responsive actuator may be rearranged to have a high temperature response for compensating for above normal temperatures by reversing the two thermal or bi-metallic strips 396 of each element pair 396a so that the low temperature sides L of the two strips are innermost and face one another. Both low and high temperature response can be achieved by utilizing both types of thermal element pairs and appropriate spacers in the temperature responsive means or actuator 394.

The modified capacity fuse valve 500 of FIGS. 20-31 is similar in many respects to the valve of FIGS. 10-13. Thus, the valve 500 has an elongate tubular body 502 including an outer tubular section 504 having an open end and an inner tubular section 506 threaded in and sealed to the open end of the outer section. The inner body section 506 contains a fluid inlet 508 opening axially through the outer end of the section and a cylindrical inlet chamber 509 opening axially to the inlet 508 and through the inner end of the inner body section. Opening through the opposite end of the inner body section 504 is an outlet 510. Coaxially disposed within the outer body section 504 is a sleeve 512 the right end of which, as viewed in the drawings, is fixed within the outlet end of the outer body section. This end of the sleeve 512 contains a coaxial opening 514 to the outlet 510 in the outer body section 504 and is sealed to the outer body section about the opening 514 by a seal ring 516.

Valve body sleeve 512 is radially spaced from the outer body section 504 to form therebetween an annular flow space 518 communicating to the valve outlet 510 through passages 520 in the right end of the sleeve. At the left end of the sleeve 512 is an end member 522 having an annular shoulder portion 524 fixed within the sleeve and a skirt 526 extending coaxially through the sleeve. The interior of the sleeve 512 opens endwise to the valve outlet 510 through the sleeve end opening 514.

Slidable within the valve body sleeve 512 is a cup-shaped shutoff valve member or piston 528. A spring 530 urges the shutoff valve member to the left in the drawings to its normal open position of FIG. 20, wherein the member abuts the shoulder 524 of the sleeve end member 522. The shutoff valve member 528 is movable to the right in the drawings to its closed position of FIGS. 22 and 29 wherein an annular valve face 532 on the right end of the valve member engages an annular valve seat 534 within the sleeve 512 about its end opening 514. At the left side of the shutoff valve member in drawings is a shutoff valve chamber 535.

Extending coaxially through and sealed by a seal ring 536 to the end member 522 of the valve body sleeve 512 is an outer stationary flow metering valve sleeve 538. An inner movable flow metering valve sleeve 540 slides within the outer valve sleeve 538. The outer valve sleeve 538 has an external shoulder 542 abutting the end member 522. The outer valve sleeve has a second external shoulder 544 abutting an inwardly directed annular flange 546 on the adjacent end of a retainer 548 slidable within the inlet chamber 509. The opposite end of the retainer 548 abuts a generally rectangular cross member 550 positioned within and extending diametrically across the inlet chamber 509. This cross member has cylindrically curved ends 552 whose curvature matches the cylindrical wall the chamber 509, as shown best in FIG. 23, and is sized to slide axially in the chamber.

Acting between the cross member 550 and an annular shoulder 554 at the juncture of the valve inlet 508 and the inlet chamber 509 is a spring washer 556 which urges the cross member to the right in the drawings. The cross member, in turn, urges the retainer 548 to the right against the shoulder 544 on the outer valve sleeve 538 and thereby urges the valve sleeve shoulder 542 to the right against end member 524 of the valve body sleeve 512. Thus, the spring washer 556 serves to yieldably hold the outer valve sleeve 538 in a fixed axial position in the valve body 502 wherein the left end of the valve sleeve in the drawings extends across a space 557 between the end member 524 and the inner valve body section 506.

Circumferentially spaced about the outer flow metering valve sleeve 538 are a number of ports 558 which are aligned with and open to the valve body space 557. As will be described presently, main fluid flow occurs through these ports from the fuse valve inlet 508 to the fuse valve outlet 510 during operation of modified capacity fuse valve 500. The outer valve sleeve also contains a number of circumferentially spaced vent ports 559 which open to an annular flow space 560 between the valve sleeve and the surrounding skirt 526 of the body sleeve end member 522. The left end of this annular flow space as it is seen in the drawings opens to the valve body space 557 through recesses 561 in the left face of the end member 522.

Referring to FIGS. 26, 27 and 28, the inner flow metering valve sleeve 540 is a generally cylindrical spool-shaped sleeve. This spool-shaped valve sleeve includes coaxial cylindrical skirt-like end portions 562 of the same outside diameter and an intervening central portion 564 of substantially smaller diameter forming a circumferential channel 566 between the end portions 562. Central valve sleeve portion 564 is surrounded by a filter screen sleeve 567 and contains a knife edged flow port 568 communicating the interior of the valve sleeve 540 to its outer channel 566. At the juncture of the left end valve sleeve portion 562 in FIGS. 26 and 28 and the central sleeve portion 564 is a tapered wall 570 containing a number of flow ports 572 also communicating the interior of the valve sleeve to its outer channel 566. The end portions 562 of the inner valve sleeve 540 are sized to fit slidably within the outer valve sleeve 538.

Acting between the right end of the inner flow metering valve sleeve 540 as it is viewed in the drawings and an inwardly directed flange 574 at the right end of the fixed outer valve sleeve 538 is a spring 576. This spring urges the inner valve sleeve to the left to its normal position of FIG. 20 wherein the left end of the sleeve abuts an annular valve sleeve stop member 578. This stop member is slidably disposed within the retainer 548 between the annular flange 546 on the retainer and the cross member 550. A spring 580 acting between the stop member 578 and the cross member 550 urges the stop member to the right toward the retainer flange 546. The retainer spring 580 is stronger than the inner valve sleeve spring 576. Accordingly, in the absence of fluid pressure at the fuse valve inlet 508, the valve sleeve spring 576 and the retainer spring 580 coact to hold the inner valve sleeve 540 and the retainer 548 in their normal positions of FIG. 20. In these normal positions, the stop member 578 abuts the retainer flange 546 and the inner flow metering valve sleeve 540 abuts the stop member.

When in its normal position of FIG. 20, the inner movable valve sleeve 540 covers the flow metering ports 558 and uncovers the vent ports 559 in the outer stationary valve sleeve 538. As explained below in connection with the operation of the fuse valve 500, the inner valve sleeve 540 is movable to the right in the drawings against the bias of its spring 576 to the position of FIG. 22 by the pressure of fluid entering the fuse valve inlet 508. During this right hand movement, the inner valve sleeve uncovers the metering ports 558 and covers the vent ports 559.

Extending coaxially from the cross member 550, through the inner valve sleeve stop member 578 and the outer flow metering valve sleeve 538 is a cylindrical flow metering valve rod 582. This valve rod includes a threaded end portion 584 which is threaded in the cross member 550 and an opposite cylindrical flow metering end portion 586 which extends into the central portion 564 of the inner movable flow metering valve sleeve 540. This flow metering end portion of the valve rod is sized to fit slidably within the central portion of the inner valve sleeve. As shown best in FIG. 31, the valve rod end portions 584, 586 are joined by a coupling 588 which restrains the end portions against relative longitudinal movement but permits relative lateral movement of the end portions in order to enable the flow metering end portion 586 to freely align itself relative to the inner valve sleeve. The thread rod end portion 584 has a slot 590 in its end to receive a screwdriver inserted through the fuse valve inlet 508 for rotating the rod adjust it axially relative to the outer valve sleeve 538. The flow metering end portion 586 of the valve rod 582 covers the inner valve sleeve port 568 when the inner valve sleeve 540 occupies its normal position of FIG. 20 and uncovers the port during movement of the inner valve sleeve to its position of FIG. 22.

The operation of the modified capacity fuse valve 500 will now be explained in connection with the valve application of FIG. 6 assuming that the inner flow metering valve sleeve 540 initially occupies its normal position of FIG. 20 wherein it closes the main flow metering ports 558 in the outer flow metering valve sleeve 538 and the flow metering valve rod 582 closes the control flow metering port 568 in the inner valve sleeve.

Assume now that the control valve C in FIG. 6 is positioned to connect the fuse valve inlet 508 to the fluid source S. Fluid under pressure is now supplied to the fuse valve inlet 508 and urges the inner flow metering valve sleeve 540 to the right in the drawings against the bias of its return spring 576. During this right hand movement of the inner valve sleeve, it progressively uncovers the main flow ports 558 in the outer valve sleeve 538 to form variable main flow metering ports 558a through which main fluid flow occurs from the fuse valve inlet 508 to the valve outlet 510 and covers the outer valve sleeve ports 559, as shown in figures 21 and 22. The flow metering valve rod 582 progressively uncovers the control flow port 568 in the inner valve sleeve to form a variable control flow metering orifice 568a through which, and the inner valve sleeve ports 572, control fluid flow occurs from the fuse valve inlet 508 to the shutoff valve chamber 535, as shown in FIGS. 21 and 22. It will be observed that the valve rod is axially adjustable to effect opening of the main flow metering ports before, simultaneously with, or after opening of the control flow metering orifice.

Thus, the flow metering valve sleeves 538, 540, the inner valve sleeve spring 576, and the flow metering valve rod 582 constitute flow splitting and proportioning means which split the incoming fluid entering the fuse valve inlet 508 into a main fluid flow and a control fluid flow whose flow rates vary in response to the flow rate of the entering fluid but remain in a fixed ratio to one another in much the same way as in the earlier described embodiments of the invention. As in these earlier embodiments, the control fluid entering the shutoff valve chamber 535 urges the shutoff valve member 528 to the right against the bias of its return spring 530 and into contact with its valve seat 534 to cutoff main flow through the fuse valve from its inlet 508 to its outlet 510 in response to passage through the fuse valve of a predetermined main flow fluid volume (main flow valve closure volume). This main flow closure volume of the fuse valve 500 is adjustable by inserting a screwdriver through the valve inlet 508 into the slot 590 in the flow metering valve rod 582 and rotating the rod in one direction or the other to adjust the main flow/control flow ratio. As explained earlier, this ratio remains constant over the entire flow rate range of the fuse valve.

Once the shutoff valve member 528 closes to cut off main fluid flow through the fuse valve 500, it remains closed until the valve inlet 508 is vented to the low pressure receiver L in FIG. 6. When the valve members thus closes, flow through the control flow metering orifice 568a ceases and the fluid pressures across the inner valve sleeve 540 equalize. The inner valve sleeve is then returned toward its normal position by its spring 576 until the control flow orifice 568a closes. During this spring return of the inner valve sleeve, fluid is displaced from the left side of the inner sleeve to the right side of the sleeve through the inner sleeve ports 572, 568 and the control flow orifice 568a. Venting of the valve inlet 508 to the receiver L (FIG. 6) permits return of the inner valve sleeve to its normal position, thereby uncovering vent ports 559 to permit the shutoff valve member 528 to be reopened by its spring 530. During this reopening of the shutoff valve member fluid is displaced from the shutoff valve chamber 535 to the right side of the valve member through the outer sleeve vent ports 559, passage 560, flow space 557, and passages 518, 520, as depicted by the arrows in FIG. 29.

A significant difference between the capacity fuse valve 500 and the fuse valves of FIGS. 1-19 resides in the way in which reverse fluid flow occurs through the valves from their outlets to their inlets. As noted earlier, the fuse valves of FIGS. 1-19 have a spring loaded check valve which opens to permit such reverse flow. The capacity fuse valve 500 has no such separate reverse flow check valve. Reverse flow, if any, will occur through the fuse valve 500 when the inner valve sleeve 540 occupies its normal position, the shutoff valve member 528 occupies its open position, and the fuse valve inlet 508 is connected to the low pressure fluid receiver R in FIG. 6. Reverse flow through the fuse valve 500 occurs through the valve outlet 510, passages 520, flow spaces 518, 557, 560, and the inner valve sleeve vent ports 559 into shutoff valve chamber 535, as shown in figure 30. The reverse flow fluid entering the chamber 535 urges the shutoff valve member 528 toward its closed position but is opposed by the pressure of reverse flow fluid entering the valve outlet and by the shutoff valve spring 530. Accordingly, the shutoff valve member 528 remains in its open position, as shown in FIG. 30. The inner metering valve sleeve 540, on the other hand, is urged to the left against the inner valve sleeve stop member 578 by the combined force of the reverse flow fluid pressure entering the chamber 535 and the inner valve sleeve spring 576. This combined leftward force on the inner valve sleeve overcomes the opposing force of the stop member spring 580. Accordingly, the inner valve sleeve 540 moves the stop member 578 to the left to the position of FIG. 30 against the thrust of the stop member spring 588. In this position of the inner valve sleeve, its central circumferential recess 566 is aligned with the flow ports 558 in the outer metering valve sleeve 538, and reverse fluid flow occurs through the outer valve sleeve ports 558, the inner valve sleeve ports 572, and the fuse valve inlet 508 to the fluid receiver R, as indicated by the arrows in FIG. 30. The spring 588 returns the stop member 578 and the inner valve sleeve 540 to their normal positions of FIG. 20 against the thrust of the inner valve sleeve spring 576 upon cessation of the reverse fluid flow.

As mentioned earlier, the control flow metering port 568 in the inner flow metering valve sleeve 540 is a knife edged port. Thus, as shown best in FIGS. 25 and 27, the port 568 is formed by a flat side on the central valve sleeve portion 564 which is disposed in a plane intersecting tangentially the central cylindrical opening through this sleeve portion to provide the port 568 with two opposing knife edges 568b. These knife edges achieve a highly important benefit. This benefit resides in the fact that the knife edges render the control flow rate through the control flow metering orifice 568a relatively insensitive to, and thus relatively independent of, the temperature and hence viscosity of the control fluid passing through the orifice. The accuracy of the fuse valve is thereby substantially enhanced in that changes in fluid viscosity caused by changes in fluid temperature will have very little if any effect on the rate of control fluid flow through the orifice and thereby very little if any effect on the main flow closure volume of the valve. As in the earlier described embodiments of the invention, the outer flow metering valve sleeve 538 and valve rod 582 constitute a stationary valve member, and the inner valve sleeve 540 constitutes a movable valve member. These valve members together form the main control flow proportioning means of the valve.

The modified capacity fuse valve 600 of FIGS. 32-34 has an elongate tubular body 602 including an outer generally tubular section 604 having an open right end and an inner tubular section 606 extending coaxially into and through the right end of the outer body section. The right end of the inner body section is threadedly joined to and is sealed by a seal ring to the outer body section, as shown. The left end of the outer body section 604 is internally threaded to form a coaxial inlet coupling 608 containing a fluid inlet 610. The right end of the inner body section 606 is internally threaded to form a coaxial outlet coupling 612 containing a fluid outlet 614.

The inner body section 606 has a left hand sleeve portion 616, the interior of which opens to the valve outlet 614 through an intervening coaxial opening 618 in the inner body section. Sleeve portion 616 is radially spaced from the surrounding wall of the outer tubular body section 604 to form therebetween an annular flow space 622 opening at its right end to the valve outlet 614 through passages 624 in the sleeve portion. Positioned within and sealed to the left end of the sleeve portion 616 is an end member 626 having a circumferential lip seating against the end edge of the sleeve portion.

Slidable within and sealed to the inner sleeve portion 616 is a generally cup-shaped shutoff valve member 628. A spring 630 urges this shutoff valve member to the left in the drawings to its normal full open position of FIG. 32, wherein the valve member abuts the sleeve end member 626. The shutoff valve member 628 is movable to the right in the drawings to a closed position shown in broken lines in FIG. 33, wherein an annular valve face 632 about the right end of the valve member engages an annular valve seat 634 within the inner body section 616 about its interior opening 618. The interior space of the sleeve portion 616 at the left side of the shutoff valve member 628 forms a shutoff valve chamber 636.

Extending coaxially through the end member 626 of the inner body section 606 is a stationary flow metering valve sleeve 638. The right end of this valve sleeve extends beyond the right side of the end member 626 and coaxially through the inner body section 606 in radially spaced relation to the surrounding sleeve portion 616. The left end of the valve sleeve 638 extends beyond the left side of the end member 626. When retracted to its normal full open position of FIG. 32, the shutoff valve member 628 surrounds the extending right end of the flow metering valve sleeve 638 in radially spaced relation to the sleeve so as to form therebetween an annular flow space 639. Slidable within the stationary flow metering valve sleeve 638 is a movable flow metering valve member 640.

The left end of the outer stationary flow metering valve sleeve 638 has a pair of axially spaced external circumferential flanges 642, 644. The right hand flange 642 in the drawings abuts the left side of the end member 626. Axially confined between the left hand flange 644 and an internal annular shoulder 645 within the left end of the outer tubular body section 604 is a ring 646. Ring 646 is sealed to the surrounding wall of the outer body section 604 and forms with the latter body section an inlet chamber 648 into which the valve inlet 610 opens. Extending through and opening through opposite sides of the ring 646 are a number of fluid passages 650. These fluid passages open leftward to the inlet chamber 648 and rightward to an annular flow space between the ring 646 and the inner body section end member 626 which surrounds the outer stationary flow metering valve sleeve 638 between its flanges 642, 644. This annular space opens to the annular flow space 622 between the outer valve body section 604 and the inner valve body sleeve portion 616.

Coaxially positioned in the inlet chamber 648 is an annular, spring biassed valve member 653 which is normally urged against the ring 646 to close the ring passages 650. The ring 646 and valve member 653 form a check valve 653a which blocks flow from the inlet chamber 648 to the flow space 652 but permits flow from the flow space to the inlet chamber during the later described reverse flow through the valve.

The end member 626 of the inner valve body section 606, the outer stationary flow metering valve sleeve 638, and the check valve ring 646 are firmly confined or clamped between the left end of the sleeve portion 616 of the inner valve body section 606 and the annular shoulder 645 within the outer body section 604. Valve 600, like all of the earlier described valves of the invention, may thus be easily assembled during manufacture and later disassembled and reassembled for repair or replacement of its parts.

Circumferentially spaced about and extending radially through the wall of the outer stationary flow metering valve sleeve 638, between its flanges 642, 644, are a number of relatively large flow ports 654 which open to the surrounding annular flow space 652. As shown in FIG. 32A, these ports open through flat outer surfaces on the valve sleeve which provide the ports with relatively sharp knife edges for the reasons explained earlier. During operation of the modified capacity fuse valve 600, main fluid flow occurs through these ports from the fuse valve inlet 610 to the fuse valve outlet 614. These main flow ports may be four in number and on the order of 0.125 inches wide to provide a total port width on the order of 0.5 inches. The right end portion of the flow metering valve sleeve 638 which is located within the inner valve body sleeve 616 contains a single flow port 656. This port opens to the annular flow space 639 which exists between the valve sleeve 638 and the shutoff valve member 628 when this valve member occupies its normal fully closed position of FIG. 32. During operation of the capacity fuse valve 600, control fluid flow occurs through the port 656 from the fuse valve inlet 610 into the shutoff valve chamber 636. The control flow port 656 is a relatively narrow slit disposed in an axial plane of the valve sleeve 638 and may be on the order of 0.005 to 0.010 inches in width, depending, of course, on the desired main flow closure volume of the valve.

The inner movable flow metering valve member 640 includes a generally cylindrical spool-shaped inner flow metering valve sleeve 660 and a check valve 661 coaxially disposed in the valve sleeve. The inner flow metering valve sleeve 660 is substantially identical to the valve sleeve 540 shown in FIGS. 26-28 except that the ports 568 in the reduced central portion of the valve sleeve 540 are omitted in the valve sleeve 660. Thus, the inner flow metering valve sleeve 660 includes coaxial cylindrical skirts 662, 664 and an intervening reduced diameter central portion 665. Skirts 662, 664 are diametrally sized to have a close sliding fit within the outer flow metering valve sleeve 638 so that the inner flow metering valve sleeve 660 is movable endwise within the valve sleeve 638. The reduced central portion 665 of the movable valve sleeve 660 forms an external circumferential channel 666 in the valve sleeve bounded by side walls 668, 669. The side wall 668 at the left hand inlet side of the valve sleeve channel 666 contains a number of flow ports 670. The outer surfaces of the valve sleeve skirt 664 and channel side wall 669 intersect along an edge 671 which extends circumferentially about the movable valve sleeve 660 and is movable back and forth across the control flow port 656 to meter control fluid flow through this port, as explained later. Extending axially through the central flow metering valve sleeve portion 665 is a fluid passage 672.

The check valve 661 of the inner movable flow metering valve member 640 comprises a check valve member 674. This check valve member includes a valve stem 676 extending coaxially through and beyond the ends of the central passage 672 through the inner movable flow metering valve sleeve 660. Fixed on left end of this valve stem is a ball 678. On the right end of the stem is a shoulder 680. Surrounding the right end of the valve stem 676 between the shoulder 680 and the adjacent wall 669 of the movable flow metering valve sleeve 660 is a sleeve 682 having side wall openings 683. The shoulder 680 slides in the adjacent end of the sleeve 682. Check valve sleeve 682 has a left hand externally flanged end which fits closely within the right hand movable flow metering valve sleeve skirt 664 and abuts the right wall 669 of the flow metering valve sleeve 660. A coil spring 684 surrounds the check valve sleeve 682 and engages the left hand flange on this sleeve and an internal shoulder 686 at the right hand end of the outer stationary flow metering valve sleeve 638. Spring 684 urges the flanged end of the check valve sleeve 682 against the movable flow metering valve sleeve wall 669 and thereby the sleeves 660, 682 to the left as a unit toward their positions of figure 32. The check valve sleeve 682 and inner flow metering valve sleeve 660 are urged in unison to the left in the drawings within the outer stationary flow metering valve sleeve 638 by the spring 684 and are movable in unison to the right against the force of the spring 684.

Within the check valve sleeve 682 between and engaging shoulder-like projections 687 within this sleeve and the shoulder 680 on the check valve stem 676 is a coil spring 688. This coil spring urges the check valve member 674 to the right in the drawings to its closed position of figure 32 wherein the check valve ball 678 engages an annular valve seat 690 about the adjacent end of the fluid passage 672 through the movable flow metering valve sleeve 660 to block fluid flow through the passage. The check valve 661 is normally closed and opens only to permit reverse flow through the fuse valve 600 in the manner explained later.

Extending coaxially through and threaded in the ring 646 of check valve 653a is a tubular stop member or stop screw 690 for limiting left hand movement of the inner movable flow metering valve member 640 by the spring 684. The right end of this stop screw has approximately the same outside diameter as the adjacent skirt 662 on the movable flow metering valve sleeve 660. Accordingly, this end of the stop screw can freely enter the adjacent end of the stationary flow metering valve sleeve 638. In the normal position of the movable valve member 640, shown in FIG. 32, the left edge 692 of its valve sleeve skirt 662 abuts the adjacent, right edge 694 of the stop screw 690. The stop screw thereby positions the movable flow metering valve sleeve 660 axially relative to the outer stationary flow metering valve sleeve 638. The edges 692, 694 form flat seating or sealing edges which are urged into fluid sealing contact with one another by the spring 684 when the valve sleeve 660 occupies this normal position. As described presently, during operation of the fuse valve 600, the valve sleeve sealing edge 692 separates from the stop screw sealing edge 694 and moves back and forth across the main flow metering ports 654 to meter main fluid flow through these ports.

The interior of the stop screw 690 opens to the inlet chamber 648 through ports 695 in the wall of the stop member. The left end of the stop screw is closed by an end wall containing a slot 696 to receive a screwdriver inserted through the valve inlet 610 for rotating and thereby axially adjusting the stop screw relative to the stationary valve sleeve 638.

The operation of the capacity fuse valve 600 will now be explained, again assuming that the valve is connected in a fluid handling system like that shown in FIG. 6. When the control valve C in FIG. 6 is positioned to connect the fuse valve inlet 610 to the low pressure receiver L, the fuse valve parts occupy their normal positions of FIG. 32. In these normal positions, (a) the shutoff valve 628 is held fully open by its spring 630, (b) the sealing edge 692 of the inner movable flow metering valve sleeve 660 is held in fluid sealing contact with the sealing edge 694 on the stop screw 690 by the spring 684, thereby closing the main flow ports 654 in the stationary valve sleeve 638, (c) the right hand valve sleeve skirt 664 of the movable valve member 640 covers and thereby closes the control flow port 664 in the stationary valve sleeve 638, and (d) the check valve 661 of the movable valve member 640 is held closed by the spring 688.

Assume now that the control valve C in FIG. 6 is positioned to connect the fuse valve inlet 610 to the fluid source S. Fluid under pressure now enters the valve inlet and flows through the inlet chamber 648 into the interior of the stop screw 690 through its ports 695. The pressure of this entering fluid moves the inner flow metering valve member 640 to the right in the drawings against the bias of its return spring 684. During this right hand movement of the movable valve member 640, its sealing edge 692 separates from the sealing edge 694 on the stop screw 690 and progressively uncovers the main flow ports 654 in the stationary valve sleeve 638 to form variable main flow metering ports 654a (FIG. 33). Main fluid flow now occurs from the interior of the stop screw 690, through the main flow metering ports 654a and the annular flow spaces 652, 622 to the valve outlet 614.

During this right hand movement of the movable valve member 640 by the pressure of the incoming fluid entering the stop screw 690, the edge 671 of the right hand valve sleeve skirt 664 of the movable valve member progressively uncovers the control flow port 656 in the stationary valve sleeve 638 to form a variable control flow metering orifice 656a (FIG. 33). Control fluid flow occurs from the interior of the stop screw 690, through the ports 670 and circumferential channel 662 in the inner movable valve sleeve 660, the control flow metering orifice 656a, and the flow space 639 between the shutoff valve 628 and the stationary valve sleeve 638 into the shutoff valve chamber 636. The pressure of this control fluid entering the shutoff valve chamber 636 moves the shutoff valve 628 to the right toward its broken line closed position of FIG. 33.

It is evident from the foregoing that the sealing edge 694 of the stop screw 690 and the edges of the stationary valve sleeve ports 654 together form relatively stationary boundary means of the main flow metering ports 654a, and that the sealing edge 692 of the movable valve sleeve 660 forms relatively movable boundary means of the main flow metering ports which are movable relative to the stationary boundary means to vary the effective areas of the main flow metering ports 654a during axial movement of the movable valve sleeve relative to the stationary valve sleeve 638. The edges of the control flow slot 656 form relatively stationary boundary means of the control flow orifice 656a, and the skirt edge 671 of the movable valve sleeve 660 forms relatively movable boundary means of the control flow orifice which are movable relative to the stationary orifice boundary means to vary the effective area of the control flow metering orifice 656a during axial movement of the movable valve sleeve relative to the stationary valve sleeve 638.

Accordingly, the stationary flow metering valve sleeve 638, the movable valve sleeve 660, the valve member spring 684, and the stop screw 690 together constitute flow splitting and proportioning means which split the incoming fluid entering the fuse valve inlet 610 into a main fluid flow and a control fluid flow whose flow rates vary in response to the pressure entering the valve inlet 610 but remain in a fixed ratio to one another as in the earlier described embodiments of the invention. The control fluid entering the shutoff valve chamber 636 urges the shutoff valve member 628 to the right against the bias of its return spring 630 and into contact with its valve seat 634 to cutoff main flow through the fuse valve from its inlet 610 to its outlet 604 in response to passage through the fuse valve of a predetermined main flow volume (main flow closure volume).

This main flow closure volume of the fuse valve 600 is adjustable by inserting a screwdriver through the valve inlet 610 into the slot 696 in the stop screw 690 and rotating the stop screw in one direction or the other to adjust the stop screw axially. It is evident that because of the absence of any fluid pressure on the movable valve member 640 during this adjustment, the movable valve sleeve 660 is retained in contact with the stop screw by the spring 684 and is therefore adjusted axially with the stop screw relative to the stationary valve sleeve 638. The sealing edges 692, 694 of the movable valve member and stop screw thus remain in contact, and hence the main flow metering ports 654a remain closed, during such stop screw adjustment. On the other hand, axial adjustment of the movable valve sleeve relative to the stationary valve sleeve by this adjustment of the stop screw varies the effective area of the control flow metering orifice 656a. In other words, adjustment of the stop screw 690 adjusts the effective area of the control flow orifice 656a independently of fluid pressure and independently of the effective area of the main flow metering ports 654a. This independent adjustment of the control flow orifice area, in turn, varies the area ratio of the main flow metering ports 654a and the control flow orifice 656a in any given axial position of the movable valve sleeve 660 relative to the stationary valve sleeve 638 and thereby the main flow/control flow ratio and resulting main flow closure volume of the capacity fuse valve 600.

Once the shutoff valve 628 closes to cutoff main fluid flow through the fuse valve 600, the fluid pressures across the movable valve member 640 equalize. The movable valve member is then returned toward its normal position of FIG. 32 by the spring 684 until the control flow orifice 656a closes. During this spring return of the inner valve sleeve, fluid is displaced from the left side of the movable valve member to the right side of the sleeve through the movable valve sleeve ports 670, orifice 656a, and flow space 639 about the fixed valve sleeve 638. The shut off valve 628 remains in its closed position as long as fluid under pressure is supplied to the valve. Venting of the valve inlet 610 to the low pressure receiver L in FIG. 6 permits return of the movable valve member 640 to its normal position by spring 684. With the valve inlet thus vented to the fluid receiver, the thrust of the spring 630 against the shutoff valve 628 produces a fluid pressure differential across the check valve 661 which opens the check valve member 674 against the bias of its spring 688 to permit fluid displacement from the shutoff valve chamber 636 to the valve inlet and thereby spring return of the shutoff valve member to its open position. Reverse flow of fluid under pressure through the fuse valve 600 from its outlet 614 to its inlet 610 occurs through the flow spaces 622, 652, and the check valve 653a.

Thus, there have been shown and described several presently preferred embodiments of the novel capacity fuse valve of the invention which achieve all of the objects and advantages sought for the invention. Many changes, modification, variations, and other uses and applications of the invention will become apparent, however, to those skilled in the art after considering this specification together with the accompanying drawings and claims. All such changes, modifications, variations, and other uses and applications which do not depart from the spirit and scope of the invention are deemed to be covered by the invention which is limited only by the claims which follow.

The inventor claims:

1. A capacity fuse valve which closes in response to passage of a predetermined fluid volume through the valve, comprising:

a valve body having a fluid inlet and a fluid outlet,
flow proportioning means in said body including main flow port means and control flow orifice means for dividing the fluid entering said inlet into a main flow which passes through said port means to said outlet and a control flow which passes through said orifice means, and means for adjusting the effective areas of said port means and said orifice means in response to the pressure of the fluid entering through said inlet in such a way as to maintain a substantially fixed ratio of the control flow rate to the main flow rate regardless of the flow rate of the entering fluid, means for adjusting said flow rate ratio, and shutoff valve means responsive to the total volume of said control flow for blocking main flow through the valve in response to a predetermined total control flow volume.

2. A capacity fuse valve according to claim 1, wherein:

said flow rate ratio adjusting means comprises means for manually adjusting said flow rate ratio to adjust the main flow volume at which the valve closes.

3. A capacity fuse valve according to claim 1, wherein:

said flow rate ratio adjusting means comprises means for adjusting the effective area of said orifice means independently of the effective are of said port means.

4. A capacity fuse valve according to claim 2, wherein:

said manual flow rate ratio adjusting means comprises means for adjusting the effective area of said orifice means independently of the effective area of said port means.

5. A capacity fuse valve which closes in response to passage of a predetermined fluid volume through the valve, comprising:

a valve body having a fluid inlet and a fluid outlet, flow proportioning means in said body for dividing the fluid entering said inlet into a main flow which passes to said outlet and a control flow whose flow rate remains in substantially fixed ratio to the main flow rate regardless of the flow rate of the entering fluid, means for adjusting said flow rate ratio, shutoff valve means responsive to the total volume of said control flow for blocking main flow through the valve in response to a predetermined total control flow volume, and wherein said flow proportioning means comprises a movable flow metering valve member movable along a direction line in one direction from a normal position to a limiting position by the pressure of fluid entering through said inlet, means for urging said valve member in the opposite direction toward said normal position against the pressure of the entering fluid such that the valve member assumes a position wherein the opposing forces on the valve member are balanced, a relatively stationary valve member, and cooperating means on said valve members defining main flow port means and control flow orifice means through which said primary and control flows pass, respectively, and which port and orifice means are progressively enlarged upon movement of said movable valve member in said one direction to increase said main and control flows, and said means for adjusting said flow rate ration comprises means for effecting relative adjustment of said cooperating means along said direction line to adjust the relative areas of said main flow port means and control flow orifice means independently of movement of said movable valve member along said direction line by the pressure fluid entering said inlet.

6. A capacity fuse valve according to claim 5, wherein:

said cooperating port and orifice defining means comprise first boundary means on said movable valve member and second boundary means on said stationary valve member which define and bound said control flow orifice means and main flow port means and undergo relative movement along said direction line to enlarge and reduce said control flow orifice means and main flow port means during movement of said movable valve member along said direction line, and said flow rate ratio adjusting means comprises means for effecting relative adjustment of said boundary means along said direction line independently of movement of said movable valve member along said direction line by the pressure fluid entering said inlet.

7. The subject matter of claim 5, wherein:

said movable valve member is movable in said opposite direction from said normal position to a limiting position and includes means for communicating said outlet to said inlet when said movable valve member occupies said limiting position, and said fuse valve includes means opposing said urging means for yieldably urging said movable valve member in said one direction to said normal position, whereby said movable valve member is movable from said normal position to said limiting position to permit reverse fluid flow from said outlet to said inlet.

8. In a fluid delivery device having a fluid inlet:

flow proportioning means including first and second flow openings for dividing the fluid entering said inlet into a first flow which passes through said first opening and a second flow which passes through said second opening and means for regulating the effective areas of said openings in response to the pressure of the fluid entering through said inlet in such a way as to maintain a substantially fixed ratio between the effective areas of said openings regardless of the flow rate of the entering fluid, and means for adjusting said flow rate ratio.

9. The subject matter of claim 8, wherein:

said flow rate ratio adjusting means comprises means for manually adjusting said flow rate ratio.

10. In a fluid delivery device having a fluid inlet:

flow proportioning means for dividing the fluid entering said inlet into a first flow and a second flow whose flow rate remains in substantially fixed ratio to the first flow rate regardless of the flow rate of the entering fluid, means for adjusting said flow rate ratio, and wherein said flow proportioning means comprises a movable flow metering valve member movable along a direction line in one direction from a normal position to a limiting position by the pressure of fluid entering the device, means for urging said valve member in the opposite direction toward said normal position against the pressure of the entering fluid such that the valve member assumes a position wherein the opposing forces on the valve member are balanced, a relatively stationary valve member, and cooperating means on said valve members defining first and second flow openings through which said first and second flows pass, respectively, and which openings are substantially closed in said normal position of said movable valve member and progressively enlarge upon movement of said movable valve member in said one direction to increase said first and second flows, and said means for adjusting said flow rate ration comprises means for effecting relative adjustment of said cooperating means along said direction line to adjust the relative areas of said openings independently of movement of said movable valve member along said direction line by the pressure fluid entering said inlet.

11. The subject matter of claim 10, wherein:

said cooperating means comprise first boundary means on said movable valve member and second boundary means on said stationary valve member which define and bound one of said openings and undergo relative movement along said direction line to enlarge and reduce said one opening during movement of said movable valve member along said direction line, and said flow rate ratio adjusting means comprises means for effecting relative adjustment of said boundary means along said direction line independently of movement of said movable valve member along said direction line by the pressure fluid entering said inlet.

12. A capacity fuse valve, comprising:

a valve body having a fluid inlet and a fluid outlet, flow proportioning means in said body for splitting the fluid entering said inlet into a main flow which follows a main flow path to said outlet and a control flow which follows a control flow path, shutoff valve means operable by said control flow for blocking main flow through the valve upon passage of a predetermined main flow volume through the valve, and wherein said flow proportioning means comprises stationary valve means, movable valve means movable relative to said stationary valve means in on direction along a direction line by the pressure of fluid entering said valve inlet, means for urging said movable valve means in the opposite direction along said direction line, whereby said movable valve means assumes an equilibrium position along said direction line determined by the fluid inflow rate through said inlet and at which the opposing forces on the movable valve means are balanced, main flow metering means associated with said valve means and defining main flow port means through which said main flow occurs, control flow metering means associated with said valve means and defining control flow orifice means through which said control flow occurs, and said port means and orifice means have effective areas which increase with movement of said movable valve means in said one direction and decrease with movement of said movable valve means in the said opposite direction in a manner which maintains a substantially fixed ratio between said effective areas and thereby a substantially fixed ratio between the main and control flow rates over a range of fluid inflow rates, and means for adjusting said flow rate ratio.

13. A capacity fuse valve, comprising:

a valve body having a fluid inlet and a fluid outlet, flow proportioning means in said body for splitting the fluid entering said inlet into a main flow which follows a main flow path to said outlet and a control flow which follows a control flow path, shutoff valve means operable by said control flow for blocking main flow through the valve upon passage of a predetermined main flow volume through the valve, and wherein said flow proportioning means comprises stationary valve means, movable valve means movable relative to said stationary valve means in on direction along a direction line by the pressure of fluid entering said valve inlet, means for urging said movable valve means in the opposite direction along said direction line, whereby said movable valve means assumes an equilibrium position along said direction line determined by the fluid inflow rate through said inlet and at which the opposing forces on the movable valve means are balanced, main flow metering means associated with said valve means and defining main flow port means through which said main flow occurs, control flow metering means associated with said valve means and defining control flow orifice means through which said control flow occurs, and said port means and orifice means have effective areas which increase with movement of said movable valve means in said one direction and decrease with movement of said movable valve means in the said opposite direction in a manner which maintains a substantially fixed ratio between said effective areas and thereby a substantially fixed ratio between the main and control flow rates over a range of fluid inflow rates, and said flow metering means include means for adjusting said effective area ratio to vary said flow rate ratio.

14. A capacity fuse valve, comprising:

a valve body having a fluid inlet and a fluid outlet, flow proportioning means in said body for splitting the fluid entering said inlet into a main flow which follows a main flow path to said outlet and a control flow which follows a control flow path, shutoff valve means operable by said control flow for blocking main flow through the valve upon passage of a predetermined main flow volume through the valve, and wherein said flow proportioning means comprises stationary valve means, movable valve means movable relative to said stationary valve means in on direction along a direction line by the pressure of fluid entering said valve inlet, means for urging said movable valve means in the opposite direction along said direction line, whereby said movable valve means assumes an equilibrium position along said direction line determined by the fluid inflow rate through said inlet and at which the opposing forces on the movable valve means are balanced, main flow metering means associated with said valve means and defining main flow port means through which said main flow occurs, control flow metering means associated with said valve means and defining control flow orifice means through which said control flow occurs, and said port means and orifice means have effective areas which increase with movement of said movable valve means in said one direction and decrease with movement of said movable valve means in the said opposite direction in a manner which maintains a substantially fixed ratio between said effective areas and thereby a substantially fixed ratio between the main and control flow rates over a range of fluid inflow rates, said main flow metering means and said control flow metering means each comprise opposing fixed and movable edge means associated with said stationary and movable valve means, respectively, and the opposing edge means define said main flow port means and said control flow orifice means, respectively, the opposing edge means undergo relative movement along said direction line to vary the effective areas of said main flow port means and said control flow orifice means during movement of said movable valve means along said direction line in such a way as to maintain said fixed flow rate ratio, and flow rate ratio adjusting means for relative adjusting one of said edge means along said direction line relative to its respective opposing edge means in such a way as to vary said effective area ratio and thereby said flow rate ratio.

15. A capacity fuse valve according to claim 14, wherein:

said one edge means is a fixed edge means.

16. A capacity fuse valve according to claim 15, wherein:

said flow proportioning means includes a stop member mounted in said valve body, movement of said movable valve means in said opposite direction occurs toward said stop member, said one edge means and its respective opposing edge means comprise confronting edges on said stop member and said movable valve means, respectively, which are disposed for contact with one another to block flow therebetween and limit movement of said movable valve means in said opposite direction, and said means for adjusting said one edge means comprises means for adjusting said stop member along said direction line relative to said valve body.

17. Fluid flow proportioning means having an inlet, comprising:

flow splitting means including first and second flow openings for splitting the fluid entering said inlet into a first flow which passes through said first flow opening and a second flow which passes through said second flow opening, means for adjusting the effective areas of said flow openings in response to the fluid inflow rate through said valve inlet in such a way as to maintain a substantially fixed ratio between the flow rates of said first and second flows over a range of fluid inflow rates, and means for adjusting said flow rate ratio.

18. Fluid flow proportioning means having an inlet, comprising:

flow splitting means including first and second flow openings for splitting the fluid entering said inlet into a first flow which passes through said first flow opening and a second flow which passes through said second flow opening, means for adjusting the effective areas of said flow openings in response to the fluid inflow rate through said valve inlet in such a way as to maintain a substantially fixed ratio between the flow rates of said first and second flows over a range of fluid inflow rates, means for adjusting the ratio of said effective areas to vary said flow rate ratio.

19. Fluid flow proportioning means having an inlet comprising:

flow splitting means for splitting the fluid entering said inlet into a first flow which follows a first flow path and a second flow which follows a second flow path, and wherein said flow splitting means comprises stationary valve means, movable valve means movable relative to said stationary valve means in one direction along a direction line by the pressure of fluid entering said valve inlet, means for urging said movable valve means in the opposite direction along said direction line, whereby said movable valve means assumes an equilibrium position along said direction line determined by the fluid inflow rate through said inlet at which the opposing forces on the movable valve means are balanced, said valve means include first and second flow openings through which said first and second flows occur, respectively, and whose effective flow areas increase with movement of said movable valve means in said one direction and decrease with movement of said movable valve means in the said opposite direction in a manner which maintains a substantially fixed ratio between said effective areas and thereby a substantially fixed ratio between the flow rates of said first and second flows over a range of fluid inflow rates, and means for adjusting said flow rate ratio.

20. Fluid flow proportioning means according to claim 19, wherein:

said flow ratio adjusting means comprises means for adjusting said effective area ratio to vary said flow rate ratio.

21. Fluid flow proportioning means according to claim 19, wherein:

each of said flow openings is defined by opposing fixed and movable edge means on said stationary and movable valve means, respectively, and said fixed and movable edge means undergo relative movement along said direction line to vary the effective areas of said flow opening during movement of said movable valve means along said direction line in such a way as to maintain said fixed ratio of said effective areas.

22. Fluid flow proportioning means according to claim 21, wherein:

said flow ratio adjusting means comprises means for adjusting one of said edge means along said direction line relative to its associated valve means in such a way as to vary said effective area ratio and thereby said flow rate ratio.

23. Fluid flow proportioning means according to claim 22, wherein:

said stationary valve means comprises a stop member, movement of said movable valve means in said opposite direction occurs toward said stop member, said one edge means and its respective opposing edges means comprise confronting edges on said stop member and said movable valve means, respectively, which define therebetween one of said flow openings and are disposed for contact with one another to both close said one flow opening and limit movement of said movable valve means in said opposite direction, and said means for adjusting said one edges means comprises means for adjusting said stop member along said direction line.

24. Adjustable fluid flow splitting means, comprising:

first and second valve members relatively movable along a direction line and including coacting means forming a first flow opening having an effective area that varies with relative movement of the valve members along said direction line, a third valve member having a normally fixed position along said direction line relative to said first valve member, coacting means on said second and third valve members forming a second flow opening having an effective area that varies with relative movement of said second and third valve members along said direction line, and means for relatively adjusting said first and third valve members along said direction line.

25. Flow splitting means according to claim 24, wherein:

said means for relatively adjusting said first and third valve members comprises at least one of the following means: (a) means for manually adjusting said third valve member relative to said first valve member, (b) fluid temperature responsive means for adjusting said third valve member relative to said first valve member in response to fluid temperature.

26. Flow splitting means according to claim 24, wherein:

said first valve member comprises an outer valve sleeve, said second valve member comprises an inner valve member movable axially in said outer sleeve, said third valve member comprises a stop member for limiting movement of said inner valve member in one direction relative to said outer valve sleeve, and said means for relatively adjusting said first and third valve members comprises means for adjusting said stop member relative to said outer valve sleeve.

27. A capacity fuse valve comprising:

a valve body having a fluid inlet and a fluid outlet, stationary valve means in said body, said stationary valve means comprises a stationary valve sleeve, and a stop member extending axially into said sleeve, movable valve means movable relative to said stationary valve means in one direction along a direction line by fluid entering said inlet and acting on one side of said movable valve means, said movable valve means comprises an inner sleeve member movable axially in said valve sleeve, said valve sleeve and inner valve member include means forming said control flow orifice means, said stop member and said inner valve member have confronting edges which form said control flow orifice means, said edges are disposed for mutual contact to both limit movement of said inner valve member in the direction of said stop member and close said orifice means, a first spring urging said movable valve means in the opposite direction, a shutoff valve member in said body having one side exposed to fluid pressure at said outlet and movable to an open position wherein said outlet is open to fluid flow therethrough and to a closed position wherein said valve member closes said outlet, a second spring urging said shutoff valve member toward its open position, and wherein:

said valve means include means for splitting the fluid entering said inlet into a main flow which follows a main flow path to said outlet and urges said shutoff valve member towards its open position and a control flow which follows a control flow path to the opposite sides of said movable valve means and said shutoff valve member to urge said movable valve means in said opposite direction and urge said shutoff valve member toward its closed position, main flow port means and control flow orifice means through which said main flow and said control flow occur, respectively, and whose effective flow areas increase with movement of said movable valve means in said one direction of its movement and decrease with movement of said movable valve means in said opposite direction of its movement in such a way that (a) said movable valve means assumes an equilibrium position along said direction line determined by the fluid inflow rate through said inlet at which the opposing fluid and spring forces on the movable valve means are balanced, (b) said effective areas are maintained in a substantially fixed ratio to maintain a substantially fixed ratio between the main flow rate and control flow rate over a range of fluid inflow rates, and (c) said shutoff valve member is moved from its open position to its closed position in response to a predetermined control flow volume along said control flow path, and means for adjusting said stop member axially to vary said effective area ratio.

28. A capacity fuse valve comprising:

a valve body having a fluid inlet and a fluid outlet, flow proportioning means in said body for dividing the fluid entering said inlet into a main flow which passes to said outlet and a control flow and including means for maintaining the flow rates of said main flow and said control flow in a substantially fixed flow ratio, means for adjusting said flow ratio, and shutoff valve means operable by said control flow for blocking main flow through the valve in response to a certain control flow volume.

29. A capacity fuse valve comprising:

a body having a fluid inlet and a fluid outlet, flow splitting means in said body having a main flow path along which a main fluid flow can occur from said inlet to said outlet and a control flow path along which a control fluid flow can occur from said inlet, a shutoff valve in said control flow path operable by said control fluid flow from an open position wherein said shutoff valve permits main fluid flow from said inlet to said outlet to a closed position wherein said shutoff valve blocks main fluid flow from said inlet to said outlet, valve means in said body for controlling fluid flow along said flow paths including a stationary valve member, a movable valve member movable relative to said stationary valve member in one direction along a direction line by fluid entering said inlet, means urging said movable valve member in the opposite direction along said direction line, whereby said movable valve member assumes an equilibrium position along said direction line wherein the forces on said movable valve member are balanced, a stationary stop member engageable by said movable valve member for limiting movement of said movable valve member in said opposite direction along said direction line, coacting means on said members for controlling fluid flow along said flow paths in response to movement of said movable valve member along said direction line in such a way that (a) movement of said movable valve member in said one direction along said direction line increase the flow rates of said main and control flows and movement of said movable valve member in said opposite direction along said direction line reduces the flow rates of said main and control flows, and (b) the ratio of said main and control flow rates remains substantially fixed over a range of fluid inflow rates through said inlet, and means for adjusting said stop member along said direction line to vary said flow rate ratio.

30. The capacity fuse valve of claim 29, wherein:

said coacting means comprise opposing edges on said valve members which define a first flow opening in said control flow path through which said control flow passes, and opposing edges on said movable valve member and said stop member which are engageable to limit movement of said movable valve member in said opposite direction along said direction line and define therebetween a second flow opening in said main flow path through which said main flow passes, and movement of said movable valve movement in said one direction enlarges said flow openings to increase said main and control flow rates, and movement of said movable valve member in said one opposite direction reduces said flow openings to reduce said main and control flow rates.

31. A flow splitting device comprising:

a body having a fluid inlet and a fluid outlet, flow splitting means in said body having a first flow path along which a first fluid flow can occur from said inlet to said outlet and a second flow path along which a second fluid flow can occur from said inlet, valve means in said body for controlling fluid flow along said flow paths including a stationary valve member, a movable valve member movable relative to said stationary valve member in one direction along a direction line by fluid entering said inlet, means urging said movable valve member in the opposite direction along said direction line, whereby said movable valve member assumes an equilibrium position along said direction line wherein the forces on said movable valve member are balanced, a stationary stop member engageable by said movable valve member for limiting movement of said movable valve member in said opposite direction along said direction line, coacting means on said members for controlling fluid flow along said flow paths in response to movement of said movable valve member along said direction line in such a way that (a) movement of said movable valve member in said one direction along said direction line increase the flow rates of said flows and movement of said movable valve member in said opposite direction along said direction line reduces the flow rates of said flows, and (b) the ratio of said flow rates remains substantially fixed over a range of fluid inflow rates through said inlet, and means for adjusting said stop member along said direction line to vary said flow rate ratio.

32. A flow splitting device according to claim 31, wherein:

said coacting means comprise opposing edges on said valve members which define a first flow opening in said first flow path through which said first flow passes, and opposing edges on said movable valve member and said stop member which are engageable to limit movement of said movable valve member in said opposite direction along said direction line and define therebetween a second flow opening in said second flow path through which said second flow passes, and movement of said movable valve member in said one direction enlarge said flow openings to increase said flow rates, and movement of said movable valve openings in said one opposite direction reduces said flow openings to reduce said flow rates.

33. A capacity fuse valve, comprising:

a valve body containing a fluid inlet and a fluid outlet, flow proportioning means in said body including main flow port means and control flow orifice means for splitting the fluid entering said inlet into a main flow which passes through said port means to said outlet and a control flow which passes through said orifice means, and means for adjusting the effective areas of said port means and said orifice means in response to the fluid inflow rate through said valve inlet in such a way as to maintain a substantially fixed ratio between the main flow rate and control flow rate over a range of fluid inflow rates, shutoff valve means operable by said control flow for blocking main flow through the valve upon passage of a predetermined main flow volume through the valve, and means adjusting said flow rate ratio.

* * * * *